(12) United States Patent
Hwang et al.

(10) Patent No.: US 11,256,377 B2
(45) Date of Patent: Feb. 22, 2022

(54) DISPLAY DEVICE

(71) Applicant: SAMSUNG DISPLAY CO., LTD., Yongin-si (KR)

(72) Inventors: Hyun-Been Hwang, Suwon-si (KR); Hirotsugu Kishimoto, Hwaseong-si (KR); Dasom Gu, Changwon-si (KR); Sung-Ki Jung, Asan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/139,769

(22) Filed: Dec. 31, 2020

(65) Prior Publication Data

US 2021/0311591 A1 Oct. 7, 2021

(30) Foreign Application Priority Data

Apr. 6, 2020 (KR) .......................... 10-2020-0041768

(51) Int. Cl.
*G06F 3/044* (2006.01)
*H01L 51/52* (2006.01)
*H01L 27/32* (2006.01)

(52) U.S. Cl.
CPC .......... *G06F 3/0445* (2019.05); *G06F 3/0446* (2019.05); *G06F 2203/04102* (2013.01); *G06F 2203/04107* (2013.01)

(58) Field of Classification Search
CPC ................. G06F 3/0445; G06F 3/0446; G06F 2203/04107; G06F 2203/04102; G06F 3/0412; G06F 3/047; G06F 2203/04103; G06F 3/0443; G06F 2203/04111; G06F 3/0416

See application file for complete search history.

(56) References Cited

U.S. PATENT DOCUMENTS

| | | | |
|---|---|---|---|
| 4,180,608 A | 12/1979 | Del | |
| 2014/0217373 A1* | 8/2014 | Youn | .................. H05K 1/0281 257/40 |
| 2016/0054832 A1 | 2/2016 | Kim et al. | |

(Continued)

FOREIGN PATENT DOCUMENTS

| | | |
|---|---|---|
| KR | 10-2012-0130638 | 12/2012 |
| KR | 10-2016-0024425 | 3/2016 |
| KR | 10-2017-0113757 | 10/2017 |

*Primary Examiner* — Md Saiful A Siddiqui
(74) *Attorney, Agent, or Firm* — F. Chau & Associates, LLC

(57) ABSTRACT

A display device includes a display panel and a sensing panel disposed on the display panel. The sensing panel includes a first conductive layer disposed on a first surface of a base layer, a second conductive layer disposed on the first conductive layer, a first auxiliary conductive layer in a folding region on the same layer as the first conductive layer on the first surface of the base layer, a second auxiliary conductive layer in the folding region on the first auxiliary conductive layer and spaced apart from the second conductive layer, a third conductive layer disposed on a second surface of the base layer, and a fourth conductive layer disposed on the third conductive layer in first and second non-folding regions. The second auxiliary conductive layer is electrically connected to the third conductive layer via a contact hole passing through the first auxiliary conductive layer and the base layer.

23 Claims, 23 Drawing Sheets

(56) References Cited

U.S. PATENT DOCUMENTS

| | | | |
|---|---|---|---|
| 2017/0242515 A1* | 8/2017 | Son | G06F 3/047 |
| 2017/0269724 A1* | 9/2017 | Son | H01L 27/3244 |
| 2017/0277288 A1* | 9/2017 | Choi | G06F 3/0412 |
| 2017/0315645 A1* | 11/2017 | Park | G06F 3/04146 |
| 2018/0284934 A1* | 10/2018 | Wu | G06F 3/0412 |
| 2019/0129541 A1* | 5/2019 | Kwon | H01L 27/322 |
| 2019/0235681 A1 | 8/2019 | Li et al. | |
| 2021/0181918 A1* | 6/2021 | Wu | G06F 3/04166 |

* cited by examiner

DISPLAY DEVICE

CROSS-REFERENCE TO RELATED APPLICATIONS

This U.S. non-provisional patent application claims priority under 35 U.S.C. § 119 to Korean Patent Application No. 10-2020-0041768, filed on Apr. 6, 2020, the disclosure of which is hereby incorporated by reference in its entirety.

TECHNICAL FIELD

Exemplary embodiments of the present inventive concept relate to a display device, and more particularly, a foldable display device.

DISCUSSION OF THE RELATED ART

Electronic devices such as televisions, mobile phones, tablet computers, navigation devices, gaming devices, etc. are provided with display devices for providing information.

As advancements in technology are made, various types of display devices have been developed. For example, foldable (or bendable) or rollable flexible display devices have been developed. Flexible display devices have variously changeable shapes and are easily carried by a user, providing improved convenience to the user.

SUMMARY

Exemplary embodiments of the present inventive concept provide a display device having improved durability.

According to an exemplary embodiment, a display device includes a display panel including a folding region foldable with respect to a folding axis, a first non-folding region adjacent to a first side of the folding region, and a second non-folding region adjacent to a second side of the folding region in a plan view, as well as a sensing panel disposed on the display panel. The sensing panel includes a first conductive layer disposed on a first surface of the base layer, a second conductive layer disposed on the first conductive layer, and a first auxiliary conductive layer disposed on the first surface of the base layer in the folding region and spaced apart from the first conductive layer. The first auxiliary conductive layer and the first conductive layer are formed in a same layer. The sensing panel further includes a second auxiliary conductive layer disposed on the first auxiliary conductive layer in the folding region and spaced apart from the second conductive layer, a third conductive layer disposed on a second surface of the base layer, and a fourth conductive layer disposed on the third conductive layer in the first non-folding region and the second non-folding region. The second auxiliary conductive layer is electrically connected to the third conductive layer via a contact hole passing through the first auxiliary conductive layer and the base layer.

In an exemplary embodiment, the first non-folding region, the folding region, and the second non-folding region are sequentially disposed in a first direction, and the first conductive layer and the second conductive layer include electrode lines extending in a second direction crossing the first direction.

In an exemplary embodiment, the first auxiliary conductive layer and the second auxiliary conductive layer are disposed between the electrode lines in the folding region.

In an exemplary embodiment, the first auxiliary conductive layer and the second auxiliary conductive layer overlap the third conductive layer in the plan view.

In an exemplary embodiment, the first surface and the second surface of the base layer are opposite to each other in a third direction crossing the first direction and the second direction.

In an exemplary embodiment, the display device further includes a cover layer disposed on the second conductive layer, and an adhesive layer disposed between the second conductive layer and the cover layer and coupling the second conductive layer and the cover layer.

In an exemplary embodiment, the display device includes a shield layer disposed on the fourth conductive layer, and an adhesive layer disposed between the fourth conductive layer and the shield layer and coupling the fourth conductive layer and the shield layer.

In an exemplary embodiment, the sensing panel includes a flexible copper clad laminated film.

According to an exemplary embodiment, a display device includes a display panel including a folding region foldable with respect to a folding axis, a first non-folding region adjacent to a first side of the folding region, and a second non-folding region adjacent to a second side of the folding region in a plan view, as well as a sensing panel disposed on the display panel and including a first panel board and a second panel board. The first panel board includes a first base layer, a first conductive layer disposed on a first surface of the first base layer, a second conductive layer disposed on the first conductive layer, and a first auxiliary conductive layer disposed on the first surface of the first base layer in the folding region and spaced apart from the first conductive layer. The first auxiliary conductive layer and the first conductive layer are formed in a same layer. The first panel board further includes a second auxiliary conductive layer disposed on the first auxiliary conductive layer in the folding region and spaced apart from the second conductive layer. The second panel board includes a second base layer, a third conductive layer disposed on a first surface of the second base layer, and a fourth conductive layer disposed on the third conductive layer in the first non-folding region and the second non-folding region. The second auxiliary conductive layer is electrically connected to the third conductive layer via a contact hole passing through the first auxiliary conductive layer and the first base layer.

In an exemplary embodiment, the display device further includes an adhesive layer disposed between the first panel board and the second panel board and coupling the first panel board and the second panel board.

In an exemplary embodiment, the first non-folding region, the folding region, and the second non-folding region are sequentially disposed in a first direction, and the first conductive layer and the second conductive layer include electrode lines extending in a second direction crossing the first direction.

In an exemplary embodiment, the first auxiliary conductive layer and the second auxiliary conductive layer are disposed between the electrode lines in the folding region.

In an exemplary embodiment, the first auxiliary conductive layer and the second auxiliary conductive layer overlap the third conductive layer in the plan view.

In an exemplary embodiment, the display device further includes a cover layer disposed on the second conductive layer, and an adhesive layer disposed between the second conductive layer and the cover layer and coupling the second conductive layer and the cover layer.

In an exemplary embodiment, each of the first panel board and the second panel board includes a flexible copper clad laminated film.

In an exemplary embodiment, the display device further includes a shield layer disposed under the second base layer, and an adhesive layer disposed between the second base layer and the shield layer and coupling the second base layer and the shield layer.

According to an exemplary embodiment, a display device includes a display panel including a folding region foldable with respect to a folding axis, a first non-folding region adjacent to a first side of the folding region, and a second non-folding region adjacent to a second side of the folding region in a plan view, as well as a sensing panel disposed on the display panel. The sensing panel includes a base layer, a first conductive layer disposed on a first surface of the base layer, a second conductive layer disposed on the first conductive layer in the first non-folding region and the second non-folding region, a third conductive layer disposed on a second surface of the base layer, and a fourth conductive layer disposed on the third conductive layer in the first non-folding region and the second non-folding region. A line width of the first conductive layer disposed in the folding region is larger than the line width of the first conductive layer disposed in the first non-folding region and the second non-folding region. The third conductive layer is disposed in the first non-folding region, the folding region, and the second non-folding region. A line width of the third conductive layer disposed in the folding region is larger than the line width of the third conductive layer disposed in each of the first non-folding region and the second non-folding region.

In an exemplary embodiment, the first surface and the second surface are opposite to each other in a thickness direction of the sensing panel.

In an exemplary embodiment, the display device further includes a cover layer disposed on the second conductive layer, and an adhesive layer disposed between the second conductive layer and the cover layer and coupling the second conductive layer and the cover layer.

In an exemplary embodiment, the display device further includes a shield layer disposed on the fourth conductive layer, and an adhesive layer disposed between the fourth conductive layer and the shield layer and coupling the fourth conductive layer and the shield layer.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION

Figure 1:
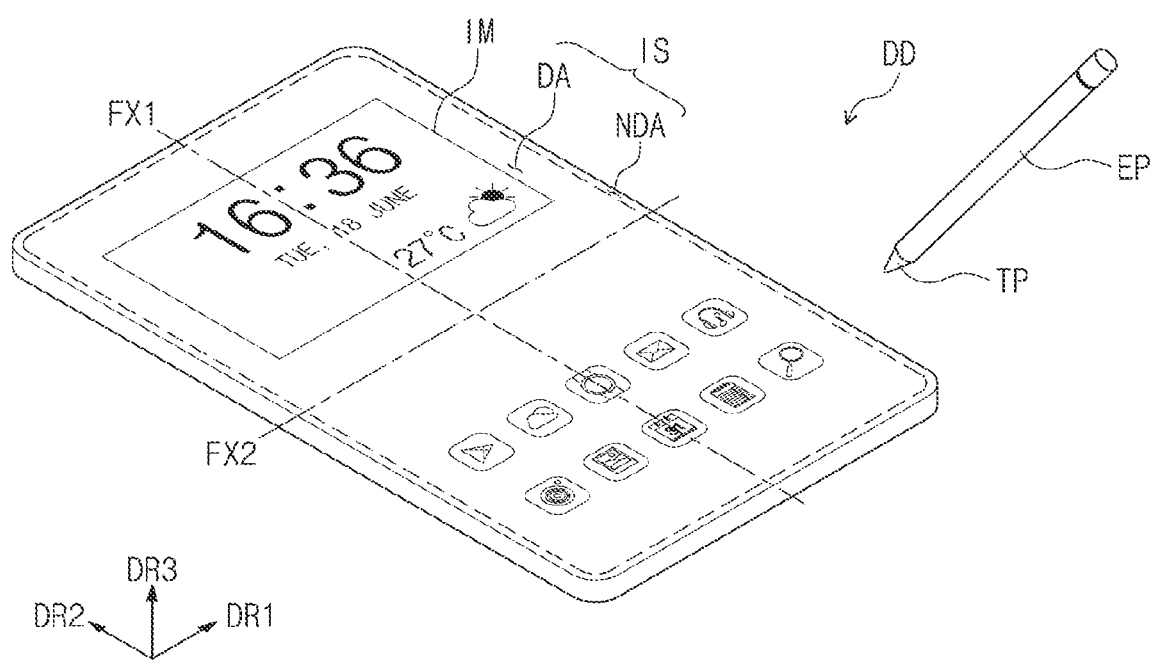
FIG. 1 is a perspective view of a display device according to an exemplary embodiment of the inventive concept.

Exemplary embodiments of the present inventive concept will be described more fully hereinafter with reference to the accompanying drawings Like reference numerals may refer to like elements throughout the accompanying drawings.

Although terms such as "first", "second", etc. are used herein to describe various elements, these elements should not be limited by these terms. The terms are only used to distinguish one component from other components. For example, without departing from the scope of the present inventive concept, a first component may be referred to as a second component, and similarly, the second component may also be referred to as the first component.

It will be understood that when a component such as a film, a region, a layer, or an element, is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words used to describe the relationship between components should be interpreted in a like fashion.

The term "and/or" includes any and all combinations of one or more of the associated listed items.

Spatially relative terms, such as "beneath", "below", "lower", "under", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below.

It will be further understood that the terms "includes" or "has" specify the presence of stated features, numbers, steps, operations, elements, components or combinations thereof, but do not preclude the presence or addition of one or more other features, numbers, steps, operations, elements, components, and/or combinations thereof.

It should be understood that descriptions of features or aspects within each exemplary embodiment should typically be considered as available for other similar features or aspects in other exemplary embodiments, unless the context clearly indicates otherwise.

As used herein, the singular forms "a", "an" and "the" are intended to include the plural forms as well, unless the context clearly indicates otherwise.

The exemplary embodiment in the detailed description will be described with plan views and cross-sectional views as ideal schematic views of the present inventive concept. Thus, the shapes of exemplary drawings may be changed according to manufacturing technology and/or allowable errors. Therefore, the exemplary embodiments of the present inventive concept are not necessarily limited to the specific shapes illustrated in the exemplary views, but may include other shapes that may be created according to manufacturing processes.

FIG. 1 is a perspective view of a display device according to an exemplary embodiment of the inventive concept.

Referring to FIG. 1, a display device DD has short sides in a first direction DR1 and long sides in a second direction DR2 crossing the first direction DR1. The short sides extending in the first direction DR1 are relatively shorter in length than the long sides extending in the second direction DR2. However, the shape of the display device DD is not limited thereto, and variously shaped display devices DD may be provided according to exemplary embodiments.

The display device DD may be a foldable electronic device. For example, the display device DD according to an exemplary embodiment of the inventive concept may be folded along folding axes FX1 and FX2 which extend in predetermined directions. Hereinafter, states of being folded along the folding axes FX1 and FX2 are defined as folding states, and states of not being folded are defined as unfolded states.

The folding axes FX1 and FX2 may extend in the first direction DR1 or in the second direction DR2. In an exemplary embodiment of the inventive concept, the folding axis extending in the second direction DR2 is defined as a first folding axis FX1 and the folding axis extending in the first direction DR1 is defined as a second folding axis FX2. Although the exemplary embodiment of FIG. 1 includes both the first folding axis FX1 and the second folding axis FX2, the inventive concept is not limited thereto. For example, according to exemplary embodiments, the display device DD may have only one of the first folding axis FX1 and the second folding axis FX2. That is, the display device DD may be folded along any one folding axis among the first folding axis FX1 and the second folding axis FX2 according to exemplary embodiments.

A display device DD according to an exemplary embodiment of the inventive concept may be a large-sized electronic device such as, for example, a television or a monitor, or a small or medium-sized electronic device such as, for example, a mobile phone, a tablet, a vehicle navigation device, or a game machine. However, the inventive concept is not limited thereto, and the display device DD may include other electronic devices according to exemplary embodiments.

As illustrated in FIG. 1, the display device DD may display an image IM on a display surface IS extending parallel to the first direction DR1 and the second direction DR2. The display surface IS on which the image IM is displayed may correspond to a front surface of the display device DD.

The display surface IS of the display device DD may be divided into a plurality of regions. For example, a display region DA and a non-display region NDA may be defined on the display surface IS of the display device DD.

The display region DA may be a region in which the image IM is displayed for a user to view. The display region DA may have a rectangular shape. The non-display region NDA may surround the display region DA. Accordingly, the shape of the display region DA may be substantially defined by the non-display region NDA. However, the inventive concept i not limited thereto. For example, according to exemplary embodiments, the non-display region NDA may be disposed adjacent to only one side of the display region DA, adjacent to some but not all sides of the display region DA, or may be omitted.

The non-display region NDA is a region which is adjacent to the display region DA and in which an image IM is not displayed. A bezel region of the display device DD may be defined by the non-display region NDA. That is, a bezel region of the display device DD may correspond to the non-display region NDA.

The non-display region NDA may surround the display region DA. However, the inventive concept is not limited thereto. For example, according to exemplary embodiments, the non-display region NDA may be adjacent to only a portion of edges of the display region DA.

The display device DD according to an exemplary embodiment of the inventive concept may detect a user's input applied from the outside. A user's input includes various types of external inputs, such as, for example, a portion of a user's body, light, heat or pressure. In addition, a user's input may also include an input using an instrument such as, for example, a touch pen or a stylus pen. In addition, the display device DD may also detect a user's input applied to a side surface or a rear surface of the display device DD according to the structure of the display device DD.

In addition, the display device DD according to an exemplary embodiment of the inventive concept may detect inputs applied from the outside by an electronic input device such as, for example, a stylus pen, a touch pen, an electronic pen, or an e-pen. In the description below, an exemplary embodiment in which the electronic input device is an electronic pen EP will be described. The electronic pen EP includes a tip TP composed of a conductive material. The display device DD may be a mutual capacitance type display device DD which detects a position at which mutual capacitance varies by contact of the tip TP of the electronic pen EP with the display surface IS, thereby detecting a user's input. In an exemplary embodiment, the display device DD may be an electromagnetic resonance (EMR) type display device DD which detects EMR due to electromagnetic induction generated between a magnetic field generated inside the display device and the tip TP of the electronic pen EP.

Figure 2A:
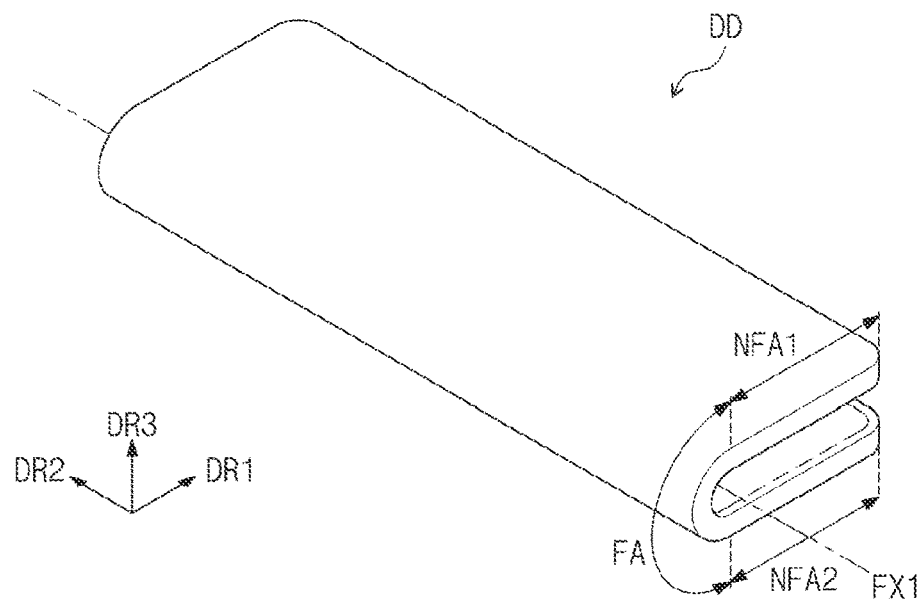
FIG. 2A is a view illustrating a state in which the display device illustrated in FIG. 1 is in-folded along a first folding axis.
Figure 2B:
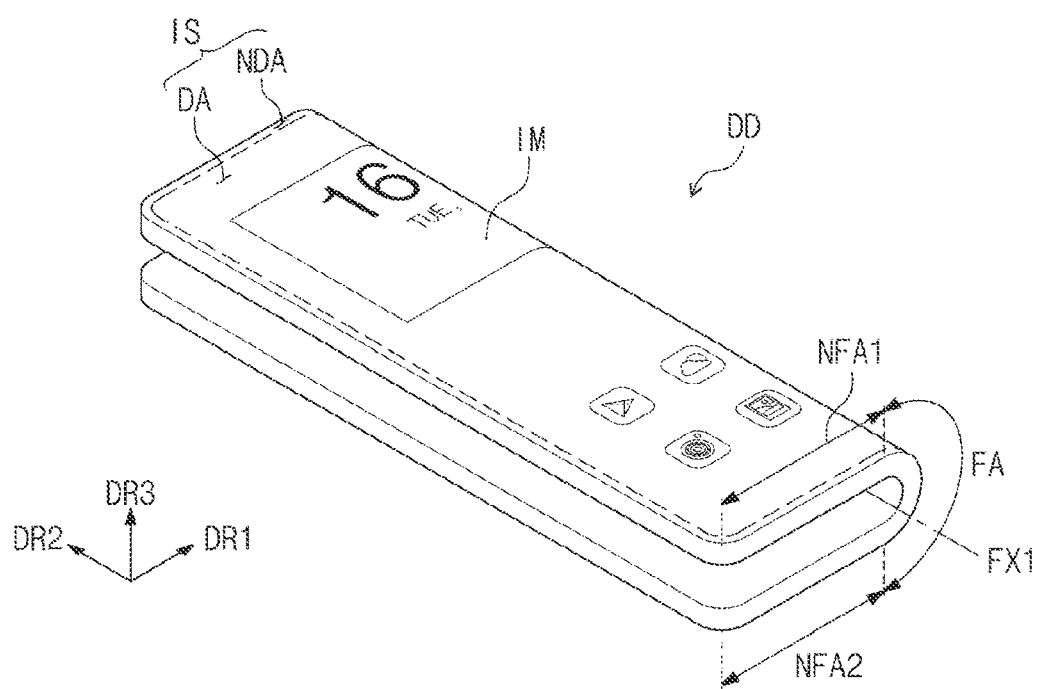
FIG. 2B is a view illustrating a state in which the display device illustrated in FIG. 1 is out-folded along a first folding axis.

FIG. 2A is a view illustrating a state in which the display device illustrated in FIG. 1 is in-folded along the first folding axis FX1. FIG. 2B is a view illustrating a state in which the display device illustrated in FIG. 1 is out-folded along the first folding axis FX1.

Referring to FIGS. 1 and 2A, the display device DD may be in-folded along the first folding axis FX1.

A plurality of regions may be defined in the display device DD according to operating types. The plurality of regions may be divided into a folding region FA and at least one or more non-folding regions NFA1 and NFA2. The folding region FA is defined between the two non-folding regions NFA1 and NFA2. For example, in an exemplary embodiment, a first non-folding region NFA1, the folding region FA, and a second non-folding region NFA2 may be sequentially disposed in the first direction DR1.

In an exemplary embodiment of the inventive concept, the non-folding regions NFA1 and NFA2 may include the first non-folding region NFA1 and the second non-folding region NFA2. The first non-folding region NFA1 is adjacent to one side of the folding region FA in the first direction DR1 and the second non-folding region NFA2 is adjacent to the other side of the folding region FA in the first direction DR1 in a plan view.

The display device DD may be subjected to in-folding as shown in FIG. 2A, or out-folding as shown in FIG. 2B. "In-folding" may refer to a folding configuration in which the display surface IS is folded inward such that the display surface IS is not exposed to the outside when the first and second non-folding regions NFA1 and NFA2 face each other, and "out-folding" may refer to a folding configuration in which the display surface IS is folded outward such that the display surface IS is exposed to the outside when the first and second non-folding regions NFA1 and NFA2 face each other.

The folding region FA is a region which is folded along the first folding axis FX1 and which substantially forms a curvature. The first folding axis FX1 may extend in the second direction DR2, that is, a direction (e.g., a long-side direction) substantially parallel to the long side of the display device DD.

The display device DD illustrated in FIG. 2A may be in-folded so that the display surface IS of the first non-folding region NFA1 and the display surface IS of the second non-folding region NFA2 face each other.

Referring to FIG. 2B, the display device DD may also be out-folded along the first folding axis FX1. When the display device DD is out-folded, the display surface IS may be exposed to the outside.

In an exemplary embodiment, the display device DD may be capable of both in-folding and out-folding. In the description below, the display device DD according to an exemplary embodiment of the inventive concept will be exemplarily described to be folded in any one of an in-folded or out-folded state.

Figure 3A:
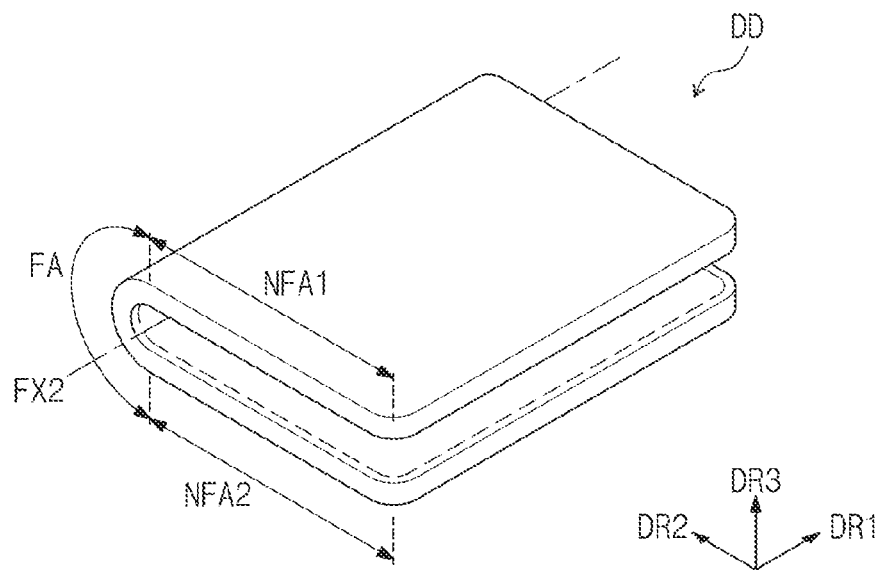
FIG. 3A is a view illustrating a state in which the display device illustrated in FIG. 1 is in-folded along a second folding axis.

FIG. 3A is a view illustrating a state in which the display device illustrated in FIG. 1 is in-folded along the second folding axis FX2. FIG. 2B is a view illustrating a state in which the display device illustrated in FIG. 1 is out-folded along the second folding axis FX2.

Figure 3B:
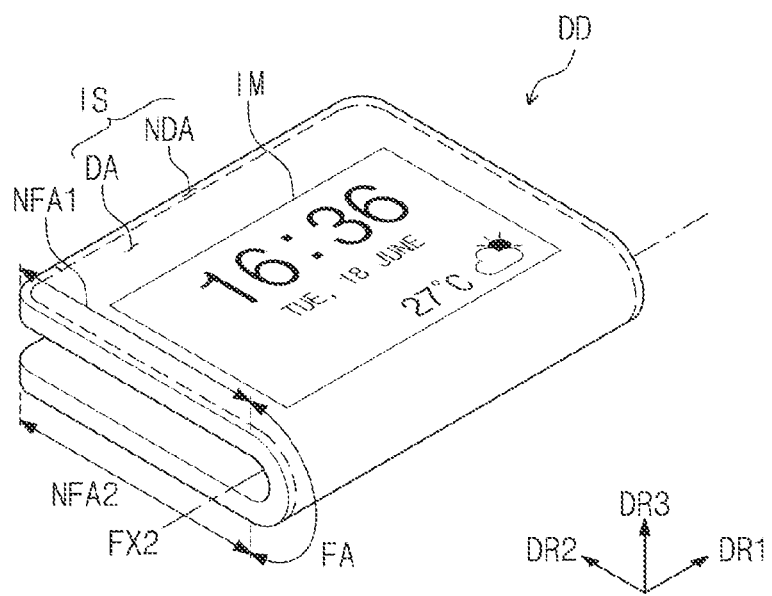
FIG. 3B is a view illustrating a state in which the display device illustrated in FIG. 1 is out-folded along a second folding axis.

Referring to FIGS. 3A and 3B, the display device DD may be in-folded or out-folded along the second folding axis FX2. The second folding axis FX2 may extend in the first direction DR1 and may be a direction (e.g., a short-side direction) substantially parallel to the short sides of the display device DD.

In the exemplary embodiment of FIGS. 3A and 3B, one folding region FA is defined in one display device DD. However, the inventive concept is not limited thereto. For example, in an exemplary embodiment of the inventive concept, a plurality of folding regions may be defined in the display device DD.

Figure 4:
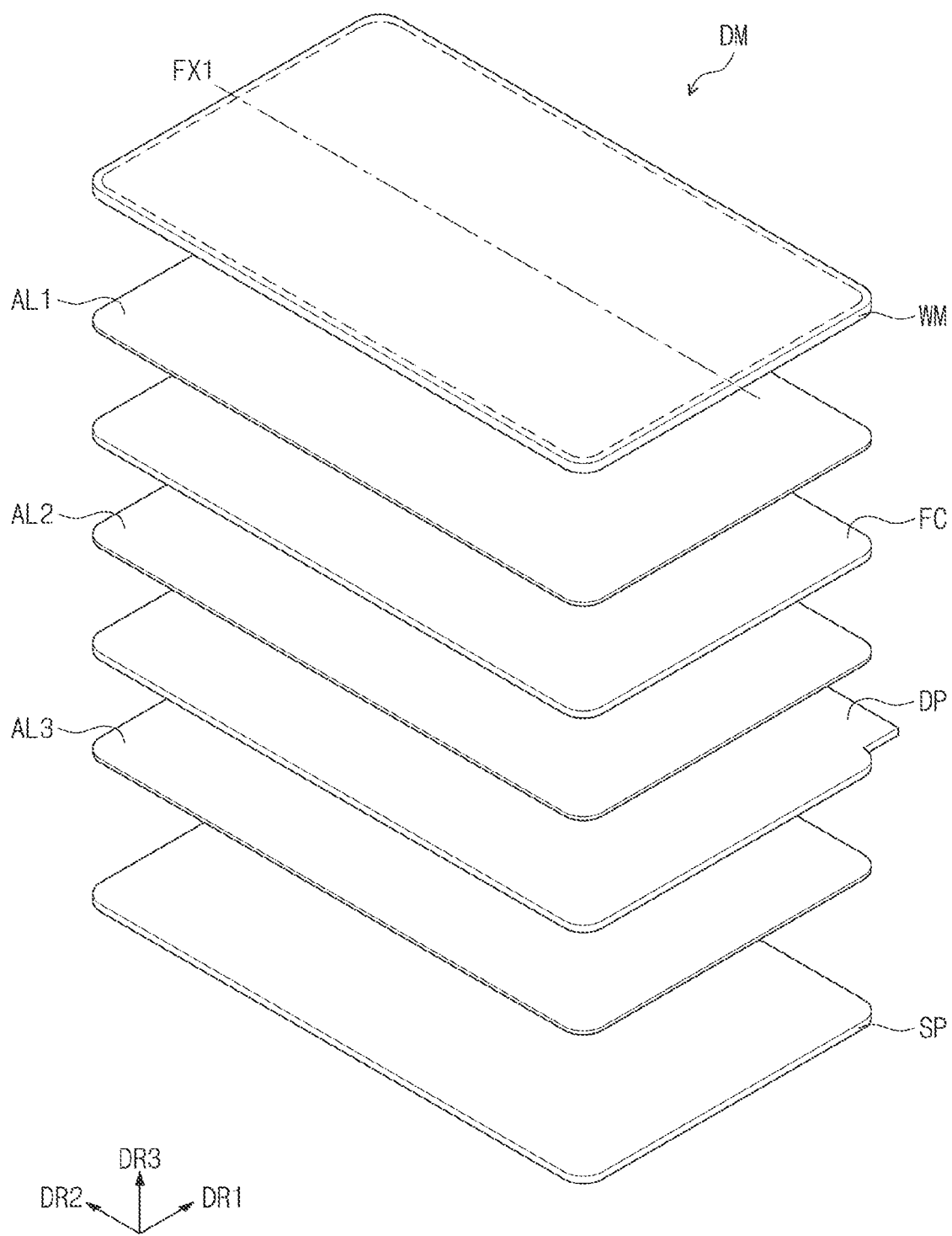
FIG. 4 is a perspective view of a display module according to an exemplary embodiment of the inventive concept.

FIG. 4 is a perspective view of a display module DM according to an exemplary embodiment of the inventive concept.

Referring to FIG. 4, a display module DM according to an exemplary embodiment of the inventive concept may include a display panel DP for displaying an image and a window module WM disposed on the display panel DP. The display module DM constitutes a portion of the display device DD (illustrated in FIG. 1). For example, the display module DM may provide the display surface IS (see FIG. 1) of the display device DD.

The display panel DP may be a flexible display panel. Accordingly, the display panel DP may be folded or unfolded about the first folding axis FX1 (see FIG. 5). In an exemplary embodiment of the inventive concept, the display panel DP may be an organic light-emitting display panel.

Figure 5:
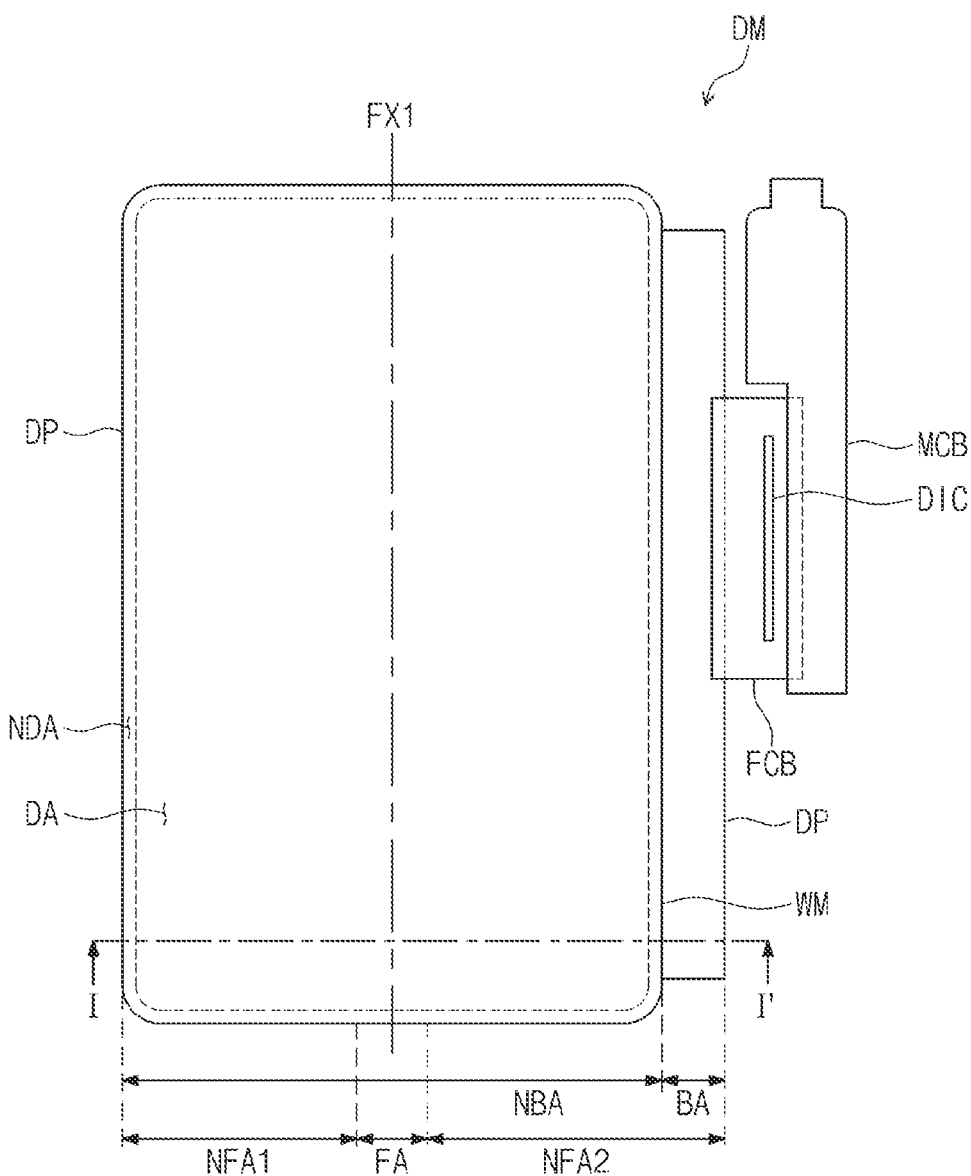
FIG. 5 is a plan view of the display module illustrated in FIG. 4 according to an exemplary embodiment of the inventive concept.

The display panel DP may be divided into the folding region FA, the first non-folding region NFA1, and the second non-folding region NFA2 (see FIG. 5). The display panel DP may be divided into a bending region BA and a non-bending region NBA (see FIG. 5). In the display panel DP, a portion of the folding region FA, the first non-folding region NFA1, and the second non-folding region NFA2 may be included in the non-bending region NBA, and a remaining portion of the second non-folding region NFA2 may be included in the bending region BA. The bending region BA will be described in further detail below.

An upper surface of the window module WM defines the display surface IS of the display device DD illustrated in FIG. 1. The window module WM may be optically transparent. Accordingly, an image generated in the display panel DP may pass through the window module WM to be viewed by a user.

The window module WM may be composed of a soft material. Accordingly, the window module WM may be folded or unfolded about the first folding axis FX1. That is, the shape of the window module WM may be deformed when the shape of the display panel DP is deformed.

The window module WM transmits an image from the display panel DP and may mitigate an external shock, thereby preventing damage to or malfunction of the display panel DP due to the external shock. The external shock may refer to a force which is exerted from the outside, and may be represented as pressure or stress from the outside which may cause a defect of the display panel DP. The window module WM may mitigate bending deformation, compressive deformation and/or tensile deformation due to a point shock or a surface shock, and may thereby prevent a defect of the display panel DP.

One or more functional layers FC may be disposed between the display panel DP and the window module WM. In an exemplary embodiment of the inventive concept, the functional layer FC may include a reflection prevention layer which blocks reflection of external light. The reflection prevention layer may prevent elements constituting the display panel DP from being visible from the outside due to external light incident through the front surface of the display device DD, thereby improving display quality. The reflection prevention layer may include a polarizing film and/or a phase delay film. The number of the phase delay films and the phase delay length ($\lambda/4$ or $\lambda/2$) may be determined according to the operation principle of the reflection prevention layer.

The functional layer FC may further include an input sensing layer which detects a user's input (for example, a touch). The input sensing layer may be formed as a separate layer from the display panel DP and be coupled through an adhesive layer. In an exemplary embodiment, an input sensing unit may be integrated with the display panel DP through at least one continuous process. That is, the input sensing unit may be disposed directly on a thin film encapsulation layer of the display panel DP. The term "directly disposed" may mean that the input sensing unit is disposed on the display panel DP without a separate adhesive member. In an exemplary embodiment, the input sensing unit is disposed on the upper surface of the display panel DP. However, the inventive concept is not limited thereto. For example, in an exemplary embodiment, the input sensing layer may be disposed on a lower surface of the display panel DP.

The functional layer FC may further include a reflection prevention member. The reflection prevention member may reduce the reflectivity of external light incident from the outside of the window module WM with respect to the display panel DP. The reflection prevention member may include, for example, a polarization film or a color filter.

The window module WM and the functional layer FC may be adhered to each other through a first adhesive layer AL1. The display panel DP and the functional layer FC may be adhered to each other through a second adhesive layer AL2.

The first adhesive layer AL1 and the second adhesive layer AL2 may be optically transparent. The first adhesive layer AL1 and the second adhesive layer AL2 may each be an adhesive layer separately manufactured by applying a liquid adhesive material and then curing the adhesive material. For example, the first adhesive layer AL1 and the second adhesive layer AF2 may each be a pressure sensitive adhesive (PSA), an optical clear adhesive (OCA), or an optical clear resin (OCR).

A sensing panel SP may be disposed on a rear surface of the display panel DP. The sensing panel SP and the display panel DP may be adhered to each other through a third adhesive layer AL3. The third adhesive layer AL3 may be implemented in the same manner as the first and second adhesive layers AL1 and AL2. The sensing panel SP may be a digitizer panel for detecting an input of the electronic pen EP illustrated in FIG. 1. In an exemplary embodiment, the sensing panel SP may be a flexible copper clad laminated film or a flexible printed circuit board. The sensing panel SP will be described in further detail below.

FIG. 5 is a plan view of the display module DM illustrated in FIG. 4 according to an exemplary embodiment of the inventive concept.

The display module DM illustrated in FIG. 5 may be in a state in which the window module WM, the functional layer FC, the display panel DP and the sensing panel SP, which are illustrated in FIG. 4, are all coupled.

The display module DM may further include a flexible circuit board FCB connected to the display panel DP and a driving chip DIC mounted on the flexible circuit board FCB. The flexible circuit board FCB may be connected to a main circuit board MCB. A control chip, a plurality of passive elements, and a plurality of active elements may be mounted on the main circuit board MCB. Similar to the flexible circuit board FCP, the main circuit board MCB may be composed of a flexible film.

In an exemplary embodiment, the display module DM may include a chip-on-film (COF) in which the driving chip DIC is mounted on the flexible circuit board FCB. However, the inventive concept is not limited thereto. For example, in an exemplary embodiment, the display module DM may include a structure of a chip-on-panel (COP), in which the driving chip DIC is mounted on the display panel DP, or a structure of a chip-on-glass (COG).

Figure 6:
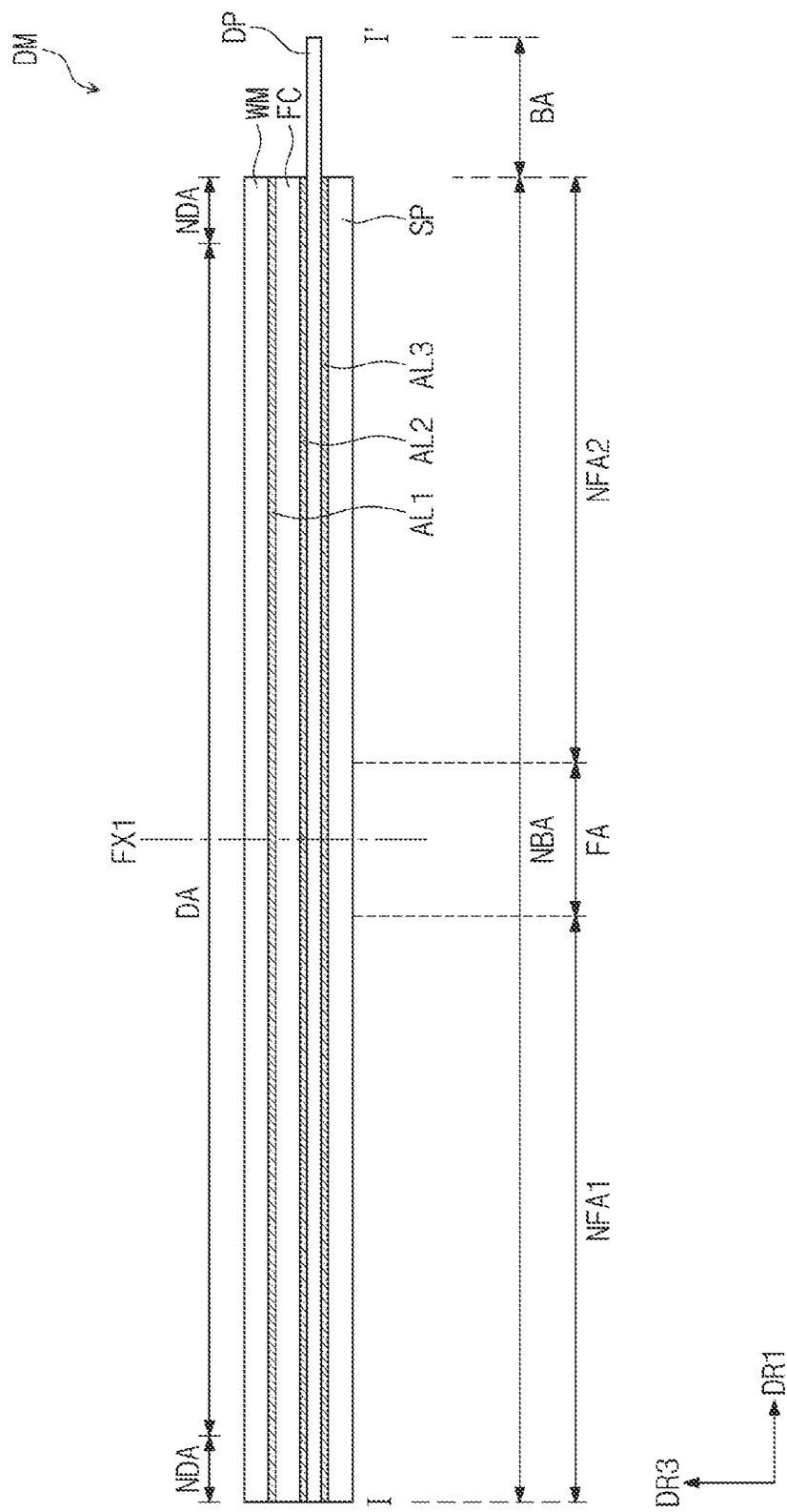
FIG. 6 is a cross-sectional view taken along line I-I' of FIG. 5 according to an exemplary embodiment of the inventive concept.

FIG. 6 is a cross-sectional view taken along line I-I' of FIG. 5 according to an exemplary embodiment of the inventive concept.

Referring to FIGS. 5 and 6, the display module DM may include a flexible display panel DP. In FIG. 6, for convenience of illustration, the display panel DP is illustrated as a single layer. However, the inventive concept is not limited thereto. For example, in an exemplary embodiment, the display panel DP may include a base layer, a circuit layer, a light-emitting element layer, and an encapsulation layer.

The display panel DP may be divided into the bending region BA and the non-bending region NBA. The non-bending region NBA may be a region including the display region DA and the non-display region NDA of the display panel DP. In the display panel DP, a portion of the folding region FA, the first non-folding region NFA1, and the second non-folding region NFA2 may be included in the non-bending region NBA, and a remaining portion of the second non-folding region NFA2 may be included in the bending region BA. The bending region BA of the display panel DP may have a predetermined curvature and may be bent toward the rear surface of the display panel DP.

In an exemplary embodiment, the sensing panel SP is disposed in an area corresponding to the non-bending region NBA of the display panel DP. In an exemplary embodiment, the sensing panel SP is disposed in the non-bending region NBA of the display panel DP and is not disposed in the bending region BA of the display panel DP. However, the inventive concept is not limited thereto. For example, in an exemplary embodiment, the sensing panel SP may extend from the non-bending region NBA into the bending region BA and may be electrically connected to the main circuit board MCB illustrated in FIG. 5.

Figure 7:
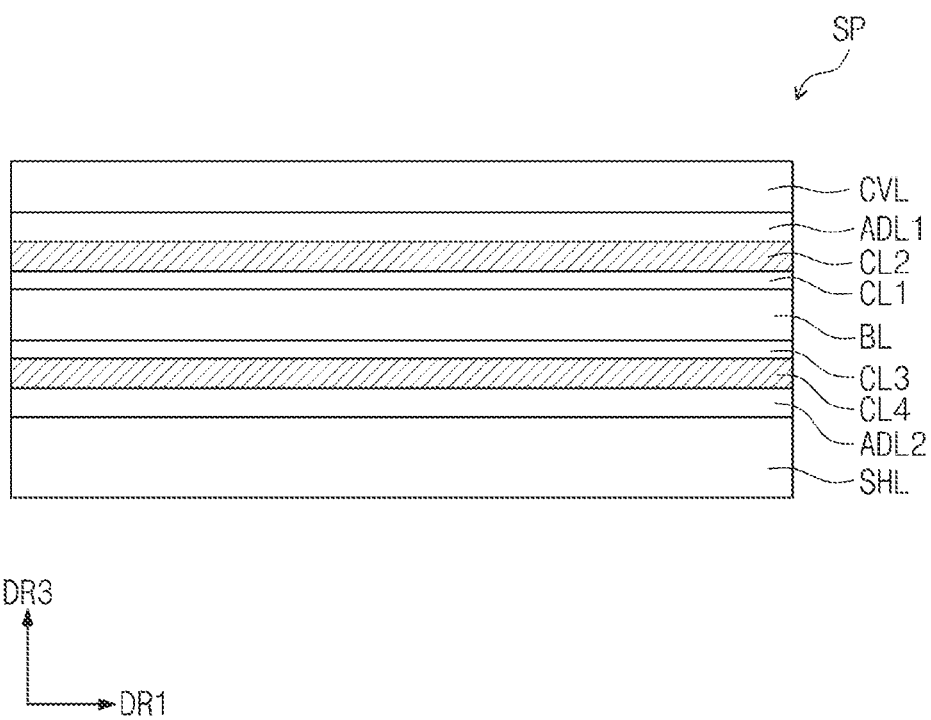
FIG. 7 is a cross-sectional view of a sensing panel according to an exemplary embodiment of the inventive concept.

FIG. 7 is a cross-sectional view of the sensing panel SP according to an exemplary embodiment of the inventive concept.

As illustrated in FIG. 7, in an exemplary embodiment, the sensing panel SP includes a base layer BL, a first conductive layer CL1, a second conductive layer CL2, a third conductive layer CL3, a fourth conductive layer CL4, adhesive layers ADL1 and ADL2, a shield layer SHL, and a cover layer CVL.

The base layer BL may include at least one synthetic resin film. The base layer BL may include a flexible plastic substrate. For example, the base layer BL may include polyimide (PI). The first conductive layer CL1 is directly disposed on a first surface (upper surface) of the base layer BL. The second conductive layer CL2 is directly disposed on the first conductive layer CL1. The second conductive layer CL2 and the cover layer CVL may be adhered to each other via the adhesive layer ADL1. The cover layer CVL may be a layer for protecting the first conductive layer CL1 and the second conductive layer CL2 from an external impact.

The third conductive layer CL3 is directly disposed on a second surface (lower surface) of the base layer BL. The second surface of the base layer BL is a surface on the reverse side of the first surface in a third direction DR3. For example, the second surface of the base layer BL opposes the first surface of the base layer BL in the third direction DR3. The third direction DR3 may be a thickness direction of the sensing panel SP.

The fourth conductive layer CL4 is directly disposed on the third conductive layer CL3. The fourth conductive layer CL4 and the shield layer SHL may be adhered to each other via the adhesive layer ADL2. The shield layer SHL may be a self-shield layer for blocking magnetism from the rear surface of the display device DD (see FIG. 1).

The first to fourth conductive layers CL1 to CL4 may each include at least one of a transparent conductive layer or a metallic layer. The transparent conductive layer may include, for example, indium tin oxide (ITO), indium zinc oxide (IZO), zinc oxide (ZnO), indium tin zinc oxide (ITZO), PEDOT, metal nanowires, or graphene. The metallic layer may include, for example, molybdenum, silver, titanium, copper, aluminum, or an alloy thereof. In an exemplary embodiment, the first conductive layer CL1 and the third conductive layer CL3 may be composed of the same material, and the second conductive layer CL2 and the fourth conductive layer CL4 may be composed of the same material.

Figure 8:
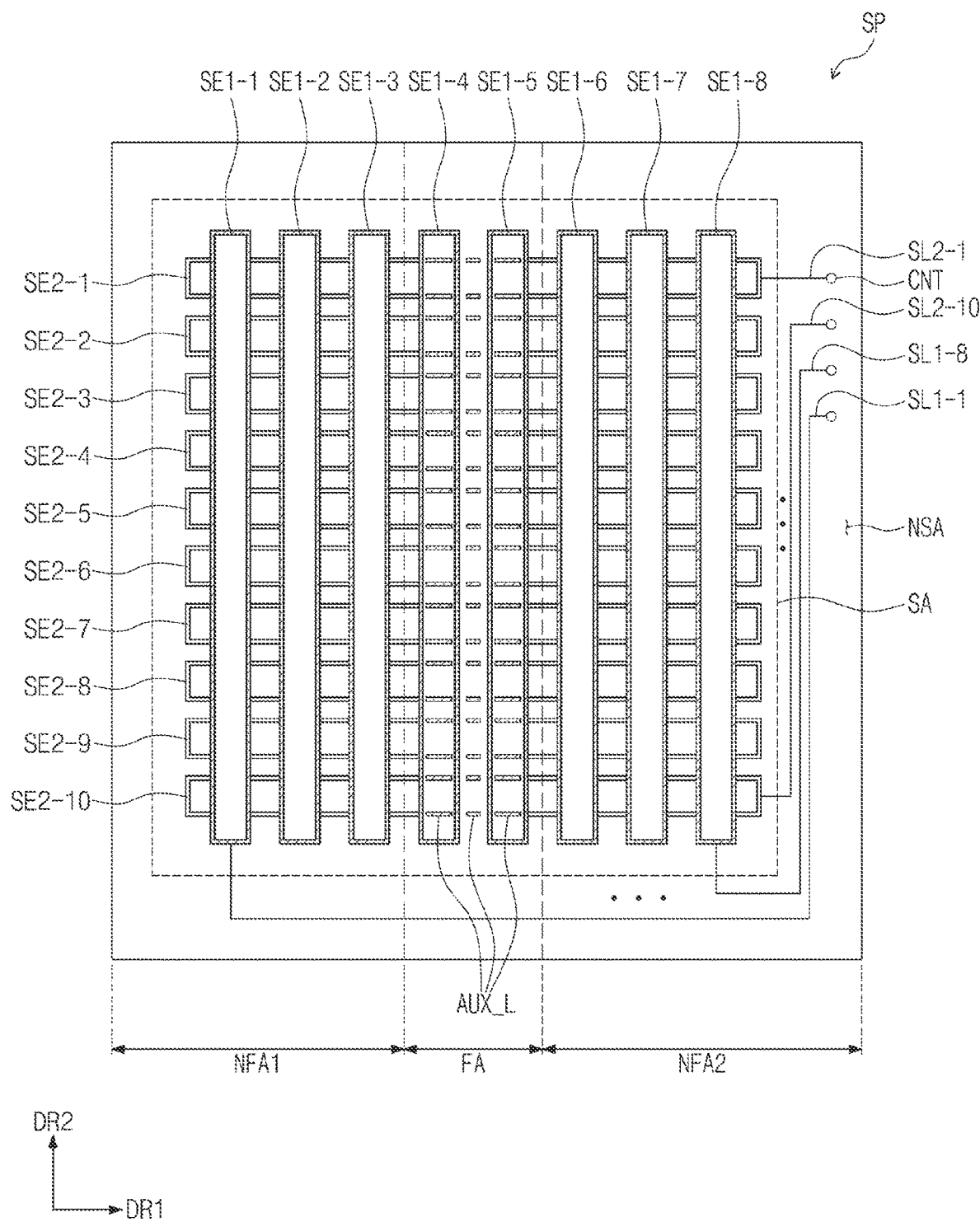
FIG. 8 is a plan view of a sensing panel according to an exemplary embodiment of the inventive concept.

FIG. 8 is a plan view of the sensing panel SP according to an exemplary embodiment of the inventive concept.

As illustrated in FIG. 8, in an exemplary embodiment, the sensing panel SP may include first sensing electrodes SE1-1 to SE1-8, second sensing electrodes SE2-1 to SE2-10, auxiliary lines AUX_L, first signal lines SL1-1 to SL1-8, and second signal lines SL2-1 to SL2-10. The sensing panel SP may include a sensing region SA and a wiring region NSA, which respectively correspond to the display region DA and the non-display region NDA of the display panel DP. The sensing region SA may be defined as a region in which the first sensing electrodes SE1-1 to SE1-8, the second sensing electrodes SE2-1 to SE2-10, and the auxiliary lines AUX_L are disposed. The wiring region NSA may be defined as a region in which the first signal lines SL1-1 to SL1-8 and the second signal lines SL2-1 to SL2-10 are disposed.

In an exemplary embodiment, the sensing panel SP may be an electrostatic capacitive sensor. In this case, any one of the sensing electrodes among the first sensing electrodes SE1-1 to SE1-8 and the second sensing electrodes SE2-1 to SE2-10 receives a driving signal, and another one of the sensing electrodes outputs, as a sensing signal, a change amount of electrostatic capacitance between the first sensing electrodes SE1-1 to SE1-8 and the second sensing electrodes SE2-1 to SE2-10.

The first sensing electrodes SE1-1 to SE1-8 each have a shape extending in the second direction DR2. For example, each of the first sensing electrodes SE1-1 to SE1-8 may extend lengthwise in the second direction DR2. In addition, the first sensing electrodes SE1-1 to SE1-8 may be arranged in the first direction DR1 and be sequentially disposed. The first sensing electrodes SE1-1 to SE1-8 may be formed from the first conductive layer CL1 and the second conductive layer CL2.

The second sensing electrodes SE2-1 to SE2-10 each have a shape extending in the first direction DR1. For example, each of the second sensing electrodes SE2-1 to SE2-10 may extend lengthwise in the first direction DR1. In addition, the second sensing electrodes SE2-1 to SE2-10 may be arranged in the second direction DR2 and be sequentially disposed. The second sensing electrodes SE2-1 to SE2-10 may be formed from the third conductive layer CL3 and the fourth conductive layer CL4.

The auxiliary lines AUX_L are disposed in the folding region FA. For example, in an exemplary embodiment, the auxiliary lines AUX_L are disposed in the folding region FA and are not disposed in the first and second non-folding regions NFA1 and NFA2. The auxiliary lines AUX_L may be formed from the first conductive layer CL1 and the second conductive layer CL2 like the first sensing electrodes SE1-1 to SE1-8. The auxiliary lines AUX_L may be electrically connected to the second sensing electrodes SE2-1 to SE2-10 through a contact hole, which will be described in further detail below.

The number of the first signal lines SL1-1 to SL1-8 may be the same as the number of the first sensing electrodes SE1-1 to SE1-8. The first signal lines SL1-1 to SL1-8 may be respectively connected to at least one end among both ends of the first sensing electrodes SE1-1 to SE1-8. The number of the second signal lines SL2-1 to SL2-10 may be the same as the number of the second sensing electrodes SE2-1 to SE2-10. The second signal lines SL2-1 to SL2-10 may be respectively connected to at least one end among both ends of the second sensing electrodes SE2-1 to SE2-10.

The first signal lines SL1-1 to SL1-8 and the second signal lines SL2-1 to SL2-10 may be connected to the main circuit board MCB illustrated in FIG. 5 via contact parts CNT. The contact parts CNT may be composed of pads that may be electrically connected to pads of the main circuit board MCB.

The first signal lines SL1-1 to SL1-8 may each be electrically connected to the corresponding first sensing electrodes among the first sensing electrodes SE1-1 to SE1-8. The second signal lines SL2-1 to SL2-10 may each be electrically connected to the corresponding second sensing electrodes among the second sensing electrodes SE2-1 to SE2-10.

The first signal lines SL1-1 to SL1-8 and the second signal lines SL2-1 to SL2-10 may each be formed on the same layer by the same material as any one among the first sensing electrodes SE1-1 to SE1-8 and the second sensing electrodes SE2-1 to SE2-10. In an exemplary embodiment, the first signal lines SL1-1 to SL1-8 and the second signal lines SL2-1 to SL2-10 may each be formed on the same layer by the same material as the second sensing electrodes SE2-1 to SE2-10. In this case, the first sensing electrodes SE1-1 to SE1-8 and the first signal lines SL1-1 to SL1-8 may be electrically connected to each other via contact holes.

Figure 9:
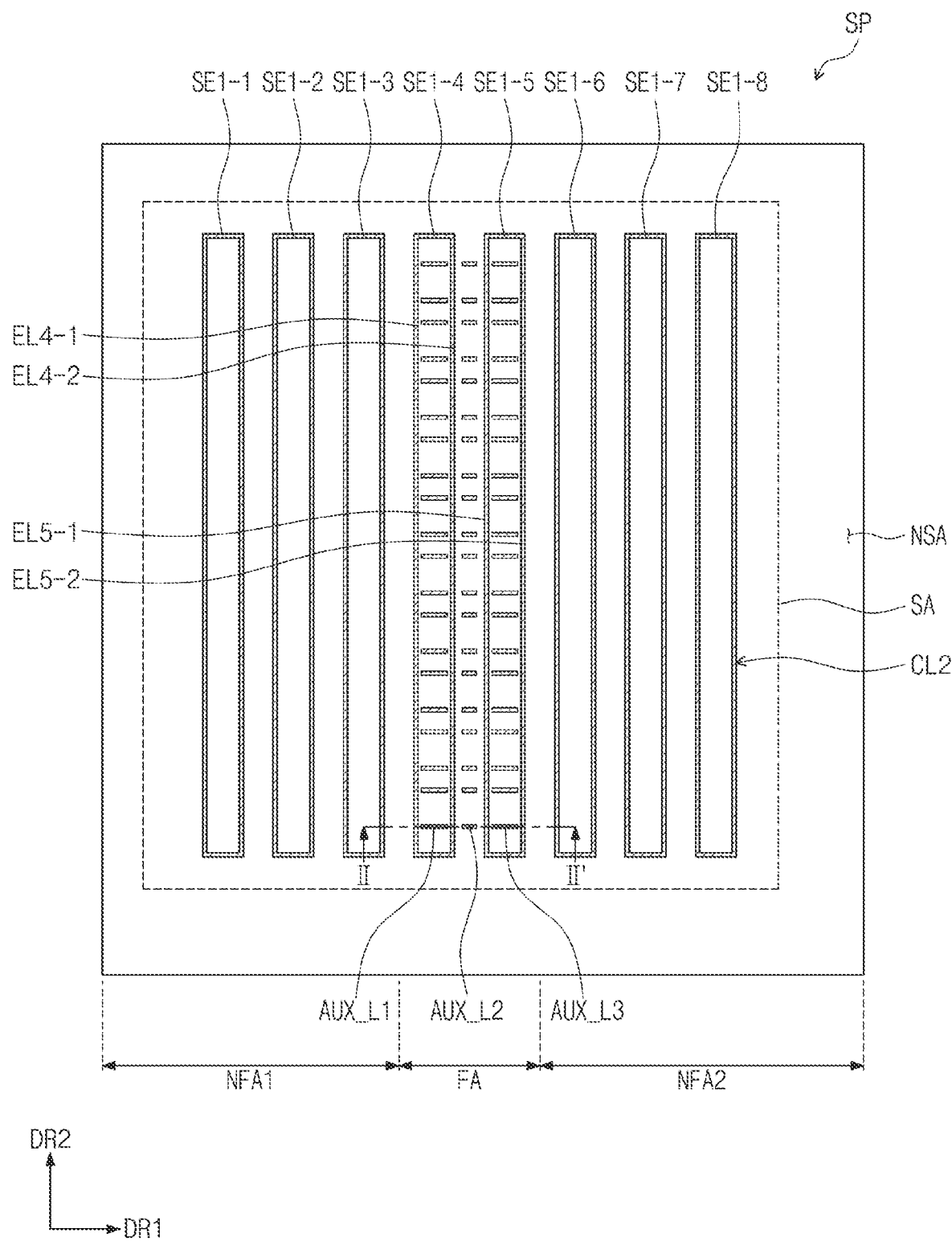
FIG. 9 is a plan view of a second conductive layer of a sensing panel according to an exemplary embodiment of the inventive concept.

FIG. 9 is a plan view of the second conductive layer CL2 of the sensing panel SP according to an exemplary embodiment of the inventive concept.

As illustrated in FIG. 9, the first sensing electrodes SE1-1 to SE1-8 and auxiliary lines AUX_L1 and AUX_L2 may be formed from the second conductive layer CL2. The first conductive layer CL1 (see FIG. 7), which is not illustrated in FIG. 9 for convenience of illustration, may have the same shape as the second conductive layer CL2.

The second conductive layer CL2 that forms the first sensing electrodes SE1-1 to SE1-8 may be disposed in the first non-folding region NFA1, the folding region FA, and the second non-folding region NFA2.

In an exemplary embodiment, auxiliary lines AUX_L1, AUX_L2 and AUX_L3 are disposed in the folding region FA, and are not disposed in the first non-folding region NFA1 and the second non-folding region NFA2. For example, the auxiliary line AUX_L1 is disposed between electrode lines EL4-1 and EL4-2 of the first sensing electrode SE1-4, the auxiliary line AUX_L2 is disposed between the electrode line EL4-2 of the first sensing electrode SE1-4 and an electrode line EL5-1 of the first sensing electrode SE1-5, and the auxiliary line AUX_L3 is disposed between electrode lines EL5-1 and EL5-2 of the first sensing electrode SE1-5. The electrode lines EL4-1, EL4-2, EL5-1 and EL5-2 may be formed by the first conductive layer CL1 and the second conductive layer CL2 (see FIG. 12A), and may extend in the second direction DR2.

Figure 10:
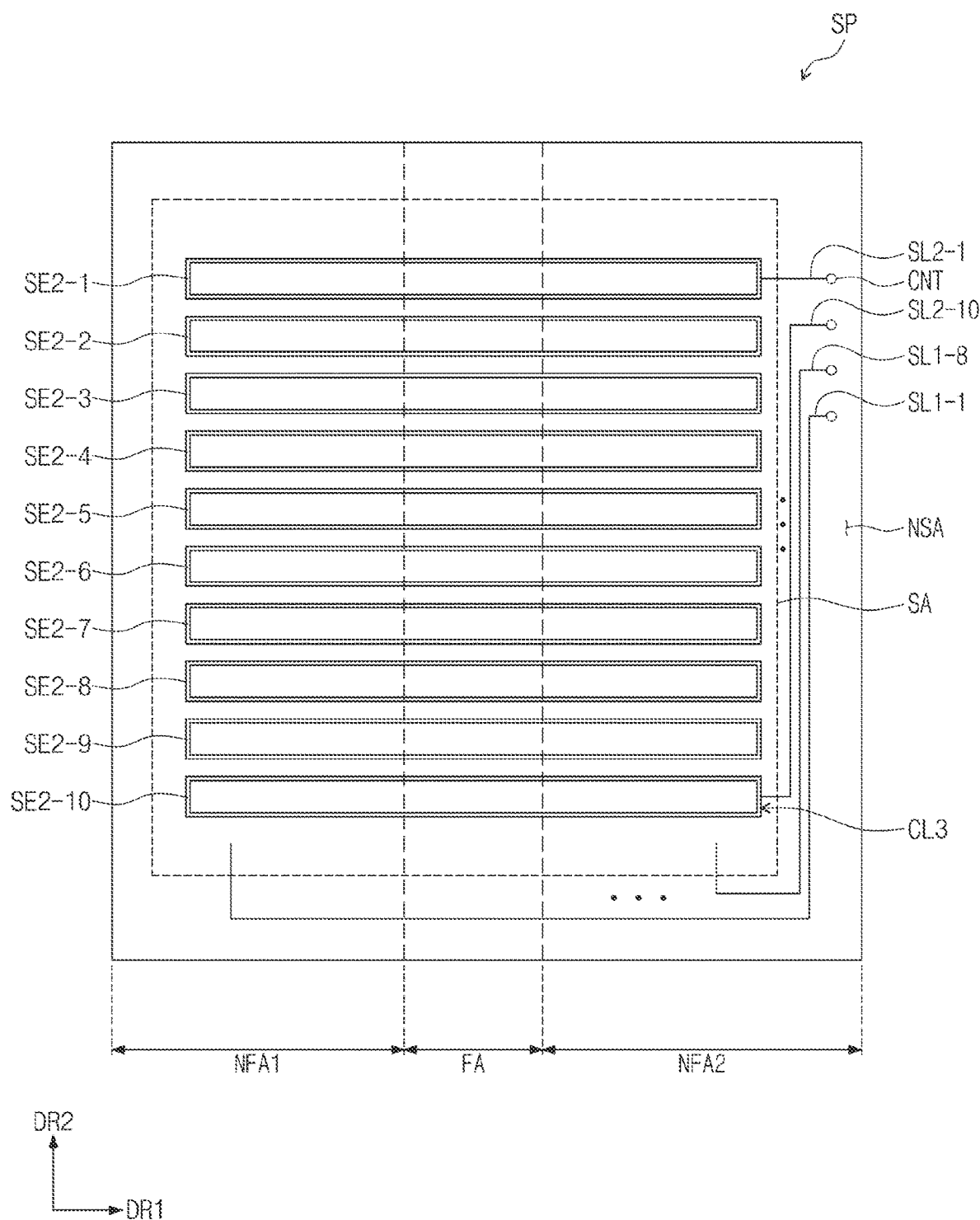
FIG. 10 is a plan view of a third conductive layer of a sensing panel according to an exemplary embodiment of the inventive concept.

FIG. 10 is a plan view of the third conductive layer CL3 of the sensing panel SP according to an exemplary embodiment of the inventive concept.

As illustrated in FIG. 10, the second sensing electrodes SE2-1 to SE2-10, the first signal lines SL1-1 to SL1-8, and the second signal lines SL2-1 to SL2-10 may be formed from the third conductive layer CL3.

The second sensing electrodes SE2-1 to SE2-10 are disposed in the sensing region SA, and the first signal lines SL1-1 to SL1-8 and the second signal lines SL2-1 to SL2-10 are disposed in the wiring region NSA.

The third conductive layer CL3 that forms the second sensing electrodes SE2-1 to SE2-10 may be disposed in the first non-folding region NFA1, the folding region FA, and the second non-folding region NFA2.

Figure 11:
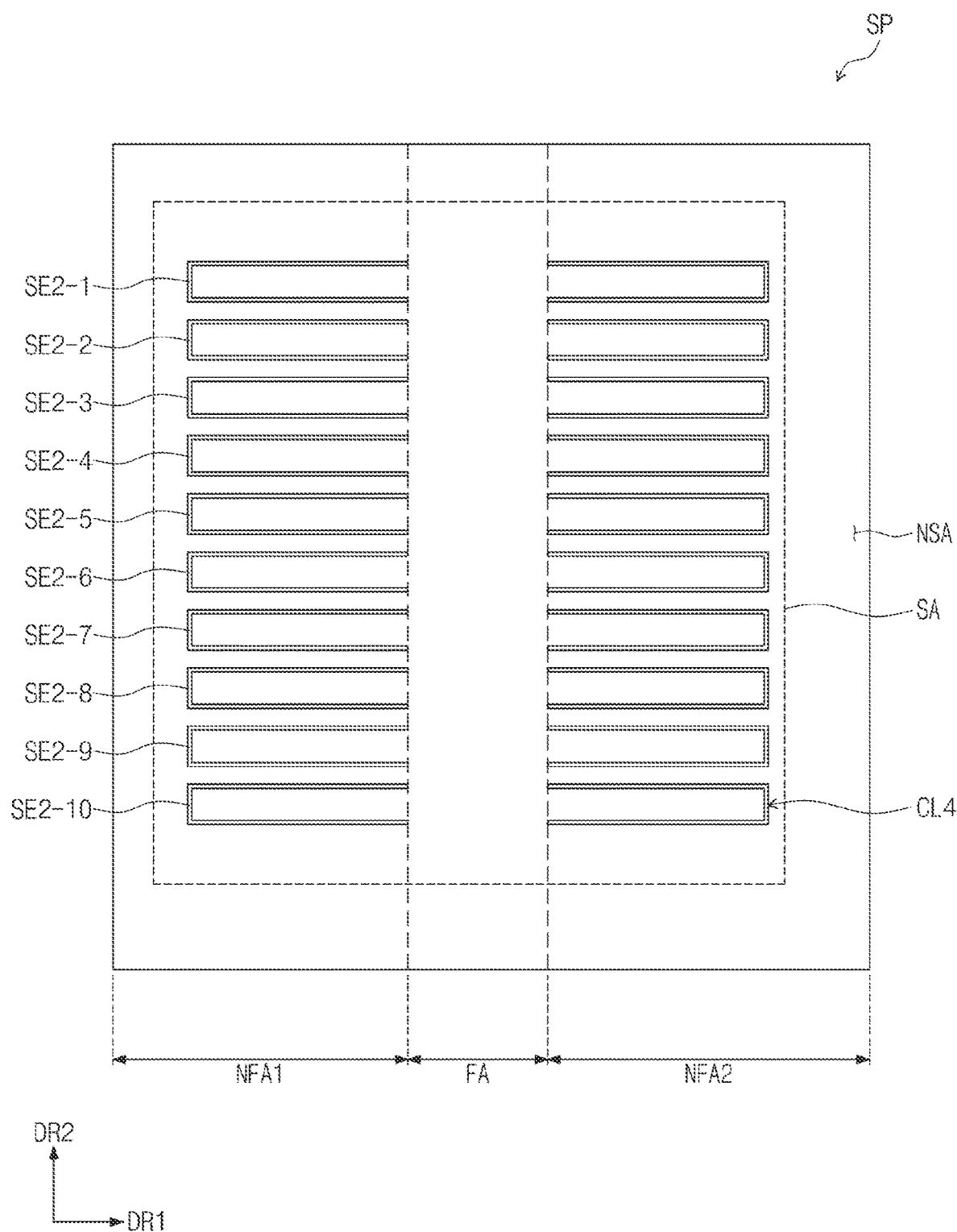
FIG. 11 is a plan view of a fourth conductive layer of a sensing panel according to an exemplary embodiment of the inventive concept.

FIG. 11 is a plan view of the fourth conductive layer CL4 of the sensing panel SP according to an exemplary embodiment of the inventive concept.

As illustrated in FIG. 11, the second sensing electrodes SE2-1 to SE2-10 may be formed from the fourth conductive layer CL4. The fourth conductive layer CL4 that forms the second sensing electrodes SE2-1 to SE2-10 may be disposed in the first non-folding region NFA1 and the second non-folding region NFA2, and is not disposed in the folding region FA.

Figure 12A:
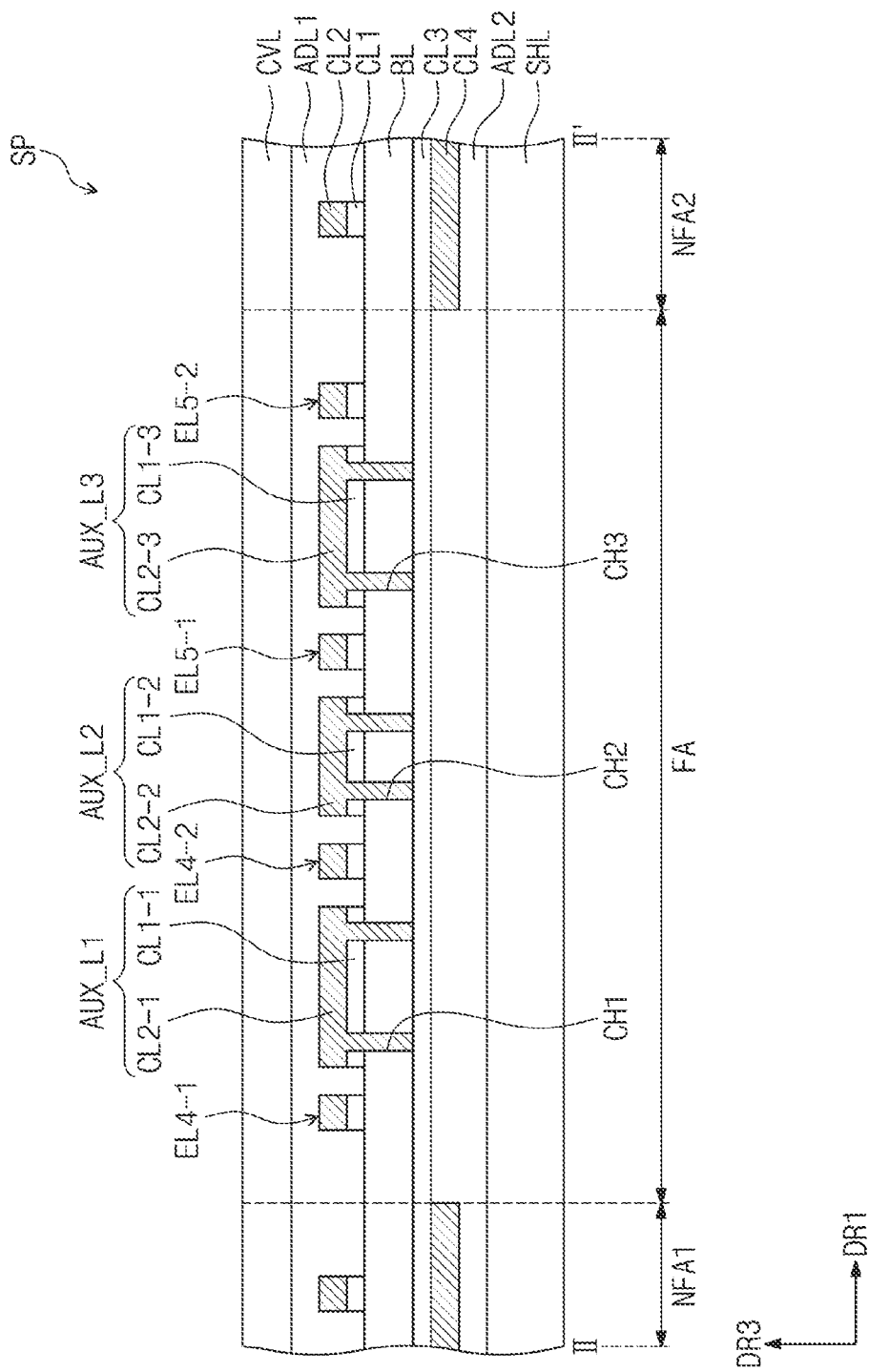
FIG. 12A is a cross-sectional view taken along line II-II' of FIG. 9 according to an exemplary embodiment of the inventive concept.

FIG. 12A is a cross-sectional view taken along line II-IF of FIG. 9 according to an exemplary embodiment of the inventive concept.

Referring to FIG. 12A, in an exemplary embodiment, the auxiliary lines AUX_L1, AUX_L2 and AUX_L3 are disposed in the folding region FA and are not disposed in the first non-folding region NFA1 and the second non-folding region NFA2. The auxiliary line AUX_L1 is formed from a first auxiliary conductive layer CL1-1 and a second auxiliary conductive layer CL2-1. The second auxiliary conductive layer CL2-1 of the auxiliary line AUX_L1 may be electrically connected to the third conductive layer CL3 through a contact hole CH1 that passes through the first auxiliary conductive layer CL1-1 and the base layer BL.

The auxiliary line AUX_L2 is formed from a first auxiliary conductive layer CL1-2 and a second auxiliary conductive layer CL2-2. The second auxiliary conductive layer CL2-2 of the auxiliary line AUX_L2 may be electrically connected to the third conductive layer CL3 through a contact hole CH2 that passes through the first auxiliary conductive layer CL1-2 and the base layer BL.

The auxiliary line AUX_L3 is formed from a first auxiliary conductive layer CL1-3 and a second auxiliary conductive layer CL2-3. The second auxiliary conductive layer CL2-3 of the auxiliary line AUX_L3 may be electrically connected to the third conductive layer CL3 through a contact hole CH3 that passes through the first auxiliary conductive layer CL1-3 and the base layer BL.

The first auxiliary conductive layers CL1-1, CL1-2, and CL1-3 may be composed of the same material as the first conductive layer CL1 and formed in the same layer as the first conductive layer CL1. For example, the first auxiliary conductive layers CL1-1, CL1-2, and CL1-3 and the first conductive layer CL1 may be formed in the same layer, which may be disposed directly on the first surface of the base layer BL. The first auxiliary conductive layers CL1-1, CL1-2, and CL1-3 and the first conductive layer CL1 are spaced apart from one another. The second auxiliary conductive layers CL2-1, CL2-2, and CL2-3 may be composed of the same material as the second conductive layer CL2 and formed in the same layer as the second conductive layer CL2. For example, the second auxiliary conductive layers CL2-1, CL2-2, and CL2-3 and the second conductive layer CL2 may be formed in the same layer, which may be disposed directly on the first auxiliary conductive layers CL1-1, CL1-2, and CL1-3 and the first conductive layer CL1. The first auxiliary conductive layers CL1-1, CL1-2, and CL1-3 and the second auxiliary conductive layers CL2-1, CL2-2, and CL2-3 are spaced apart from one another.

As illustrated in FIGS. 9, 10 and 12A, the first auxiliary conductive layers CL1-1, CL1-2, and CL1-3 and the second auxiliary conductive layers CL2-1, CL2-2, and CL2-3 overlap the third conductive layer CL3 when viewed in a plan view.

As illustrated in FIGS. 9, 10 and 12A, the first auxiliary conductive layers CL1-1, CL1-2, and CL1-3 and the second auxiliary conductive layers CL2-1, CL2-2, and CL2-3 do not overlap the fourth conductive layer CL4 when viewed in a plan view.

Reducing the thickness of the folding region FA may improve folding characteristic and durability of the sensing panel SP. In an exemplary embodiment, the fourth conductive layer CL4 is disposed only in the first non-folding region NFA1 and the second non-folding region, and is not disposed in the folding region FA. Accordingly, the thickness in the third direction DR3 in the folding region FA of the sensing panel SP may be smaller than the thicknesses in the third direction DR3 in the first non-folding region NFA1 and second non-folding region NFA2.

However, when the fourth conductive layer CL4 is not disposed in the folding region FA, the wiring resistance between the second sensing electrodes SE2-1 to SE2-10 may increase. In an exemplary embodiment, the second auxiliary conductive layers CL2-1, CL2-2 and CL2-2 may be electrically connected to the fourth conductive layer CL4 through the contact holes CH1, CH2, and CH3 and the third conductive layer CL3. Accordingly, the increase in wiring resistance due to the fourth conductive layer CL4 not being disposed in the folding region FA may be compensated by the auxiliary lines AUX_L1, AUX_L2, and AUX_L3.

Still referring to FIG. 12A, a display device DD according to an exemplary embodiment may include the display panel DP including the folding region FA foldable with respect to a folding axis (e.g., FX1 or FX2—see FIG. 1), the first non-folding region NFA1 adjacent to a first side of the folding region FA, and the second non-folding region NFA2 adjacent to a second side of the folding region FA, as well as the sensing panel SP disposed on the display panel DP. The sensing panel SP may include the base layer BL, an upper conductive layer (e.g., CL2) disposed on the upper surface of the base layer BL, an auxiliary conductive layer (e.g., CL2-1, CL2-2, or CL2-3) disposed on the upper surface of the base layer BL in the folding region FA and spaced apart from the upper conductive layer (e.g., CL2), and a lower conductive layer (e.g., CL4) disposed on the lower surface of the base layer BL in the first non-folding region NFA1 and the second non-folding region NFA2. The auxiliary conductive layer (e.g., CL2-1, CL2-2, or CL2-3) may be electrically connected to the lower conductive layer (e.g., CL4) via a contact hole (e.g., CH1, CH2, or CH3) passing through the base layer BL. For example, the lower conductive layer (e.g., CL4) may be electrically connected to the third conductive layer CL3, which may be electrically connected to the auxiliary conductive layer (e.g., CL2-1, CL2-2, or CL2-3) via the contact hole (e.g., CH1, CH2, or CH3).

Figure 12B:
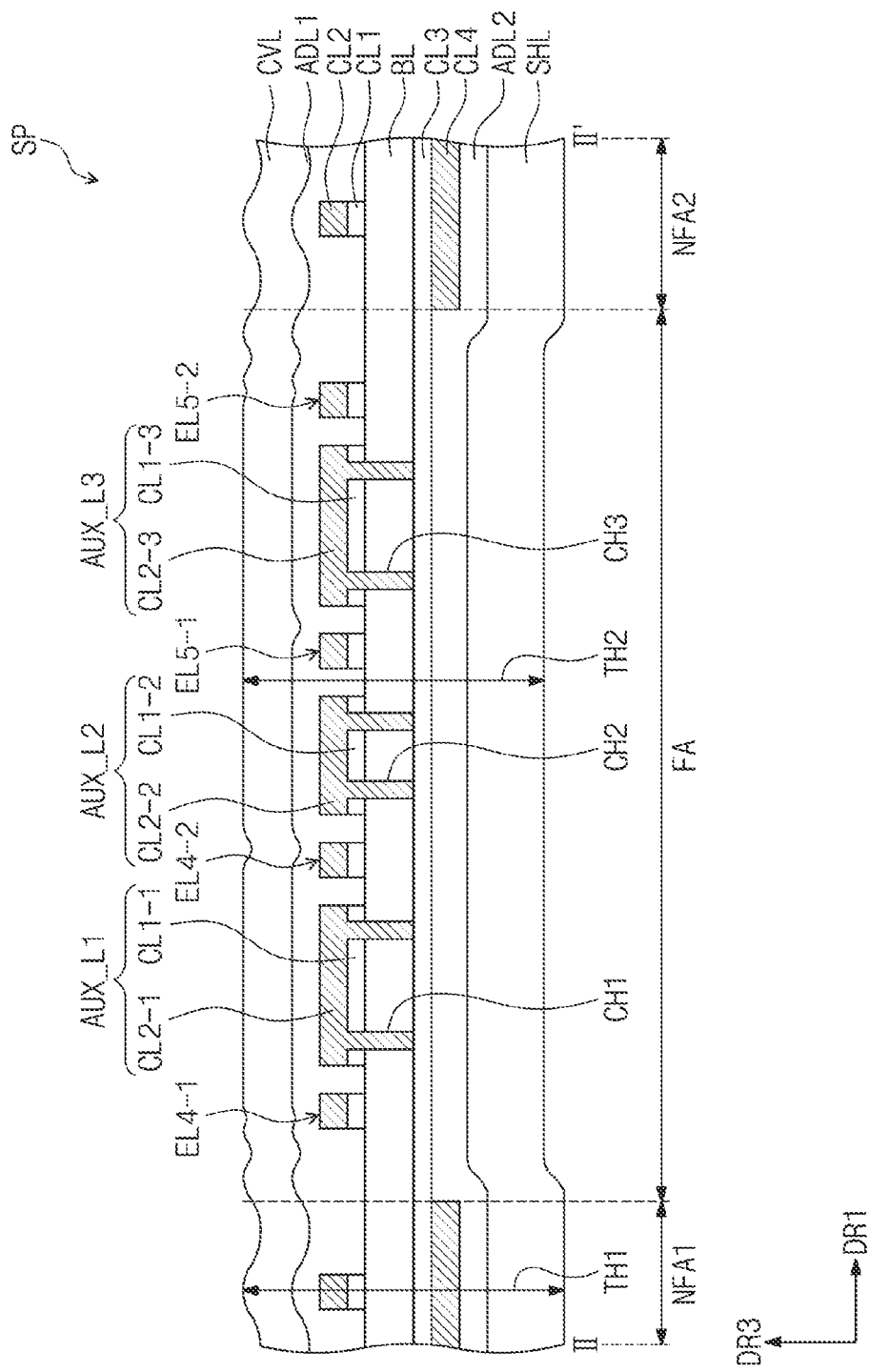
FIG. 12B is a cross-sectional view taken along line II-II' of FIG. 9 according to an exemplary embodiment of the inventive concept.

FIG. 12B is a cross-sectional view taken along line II-II' of FIG. 9 according to an exemplary embodiment of the inventive concept.

As illustrated in FIG. 12B, in an exemplary embodiment, the cover layer CVL may be coupled to the second conductive layer CL2 via a thermosetting pressing method through the adhesive layer ADL1. In addition, the shield layer SHL may be attached to the fourth conductive layer SL4 via a thermosetting pressing method through the adhesive layer ADL2. After completing the thermosetting pressing process, the thickness TH2 of the folding region FA in the third direction DR3 is smaller than the thickness TH1 of the first non-folding region NFA1 and the second non-folding region NFA2 in the third direction DR3, since the fourth conductive layer CL4 is not disposed in the folding region FA.

As illustrated in FIGS. 12A and 12B, in exemplary embodiments, in the folding region FA, the first auxiliary conductive layers CL1-1, CL1-2, and CL1-3 and the second auxiliary conductive layers CL2-1, CL2-2, and CL2-3 may be respectively disposed between electrode lines among the electrode lines EL4-1, EL4-2, EL5-1 and EL5-2, which are formed of the first conductive layer CL1 and the second conductive layer CL2 and extend in the second direction DR2.

Figure 13:
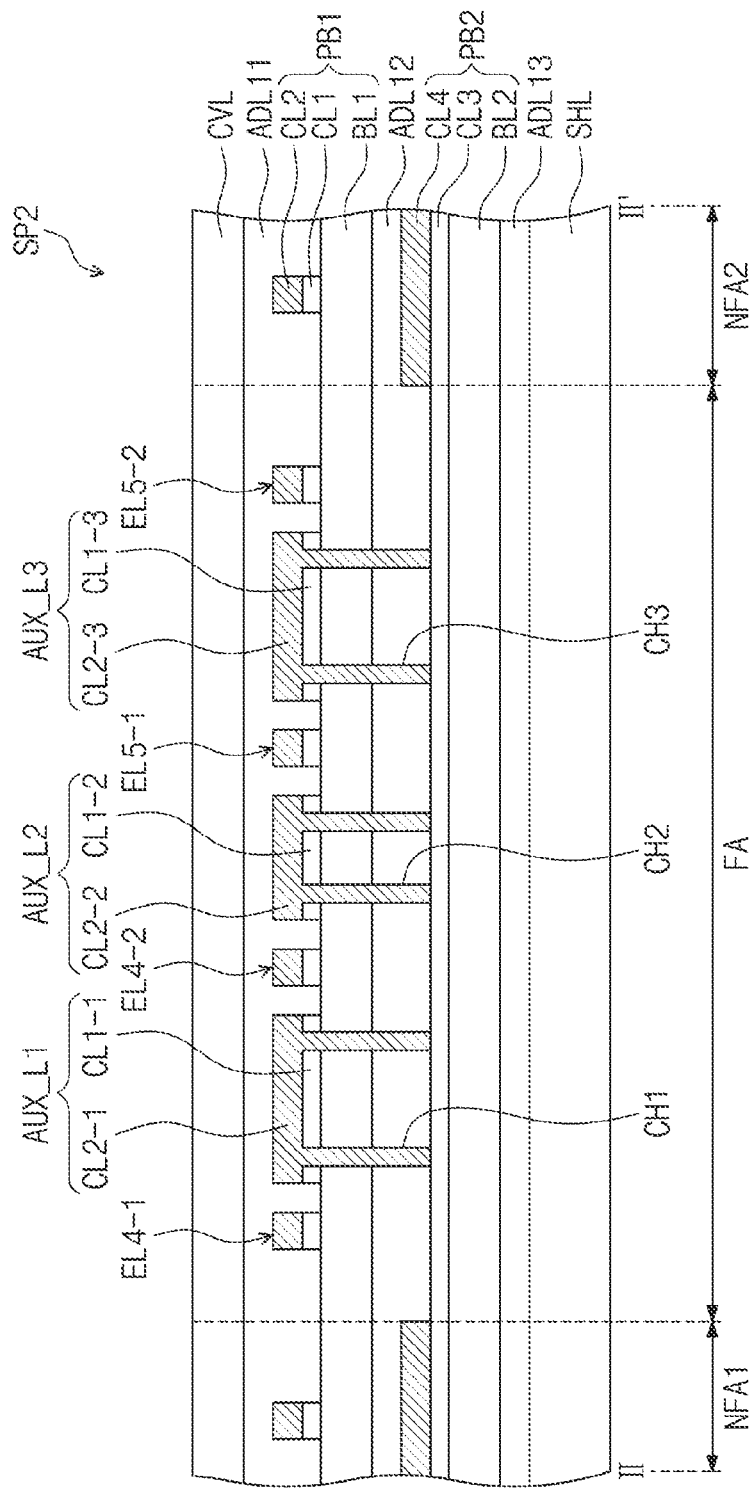
FIG. 13 is a cross-sectional view of a sensing panel according to an exemplary embodiment of the inventive concept.

FIG. 13 is a cross-sectional view of a sensing panel SP2 according to an exemplary embodiment of the inventive concept. FIG. 13 illustrates a cross-sectional view of a sensing panel SP2 at a position corresponding to line II-II' of the sensing panel SP illustrated in FIG. 9.

As illustrated in FIG. 13, the sensing panel SP2 includes a first panel board PB1, a second panel board PB2, adhesive layers ADL11, ADL12 and ADL13, a shied layer SHL, and a cover layer CVL. The first panel board PB1 includes a first base layer BL1, a first conductive layer CL1, and a second conductive layer CL2. The second panel board PB2 includes a second base layer BL2, a third conductive layer CL3, and a fourth conductive layer CL4. The first panel board PB1 and the second panel board PB2 may each be a flexible printed circuit board. The first panel board PB1 and the second panel board PB2 may be adhered to each other via the adhesive layer ADL12.

The first base layer BL1 and the second panel board PB2 may each include at least one synthetic resin film. The first base layer BL1 and the second base layer BL2 may each include a flexible plastic board. For example, the first base layer BL1 and the second base layer BL2 each include polyimide (PI).

The first conductive layer CL1 is directly disposed on a first surface (upper surface) of the first base layer BL1. The second conductive layer CL2 is directly disposed on the first conductive layer CL1. The second conductive layer CL2 and the cover layer CVL may be adhered to each other via the adhesive layer ADL11. The cover layer CVL may be a layer for protecting the first conductive layer CL1 and the second conductive layer CL2 from an external impact.

The third conductive layer CL3 is directly disposed on a first surface (upper surface) of the second base layer BL2. The fourth conductive layer CL4 is directly disposed on the third conductive layer CL3. The second base layer BL2 and the shield layer SHL may be adhered to each other via the adhesive layer ADL13. The shield layer SHL may be a self-shield layer for blocking magnetism from the rear surface of the display device DD (see FIG. 1).

Auxiliary lines AUX_L1, AUX_L2 and AUX_L3 are disposed in the folding region FA. The auxiliary line AUX_L1 is formed from a first auxiliary conductive layer CL1-1 and a second auxiliary conductive layer CL2-1. The second auxiliary conductive layer CL2-1 of the auxiliary line AUX_L1 may be electrically connected to the third conductive layer CL3 through a contact hole CH1 that passes through the first auxiliary conductive layer CL1-1, the first base layer BL1 and the adhesive layer ADL12.

The auxiliary line AUX_L2 is formed from a first auxiliary conductive layer CL1-2 and a second auxiliary conductive layer CL2-2. The second auxiliary conductive layer CL2-2 of the auxiliary line AUX_L2 may be electrically connected to the third conductive layer CL3 through a contact hole CH2 that passes through the first auxiliary conductive layer CL1-2, the first base layer BL1 and the adhesive layer ADL12.

The auxiliary line AUX_L3 is formed from a first auxiliary conductive layer CL1-3 and a second auxiliary conductive layer CL2-3. The second auxiliary conductive layer CL2-3 of the auxiliary line AUX_L3 may be electrically connected to the third conductive layer CL3 through a contact hole CH3 that passes through the first auxiliary conductive layer CL1-3, the first base layer BL and the adhesive layer ADL12.

The first auxiliary conductive layers CL1-1, CL1-2, and CL1-3 may be composed of the same material as the first conductive layer CL1 and formed in the same layer as the first conductive layer CL1. For example, the first auxiliary conductive layers CL1-1, CL1-2, and CL1-3 and the first conductive layer CL1 may be formed in the same layer, which may be disposed directly on the first surface of the first base layer BL1. The first auxiliary conductive layers CL1-1, CL1-2, and CL1-3 and the first conductive layer CL1 are spaced apart from one another. The second auxiliary conductive layers CL2-1, CL2-2, and CL2-3 may be composed of the same material as the second conductive layer CL2 and formed in the same layer as the second conductive layer CL2. For example, the second auxiliary conductive layers CL2-1, CL2-2, and CL2-3 and the second conductive layer CL2 may be formed in the same layer, which may be disposed directly on the first auxiliary conductive layers CL1-1, CL1-2, and CL1-3 and the first conductive layer CL1. The first auxiliary conductive layers CL1-1, CL1-2, and CL1-3 and the second auxiliary conductive layers CL2-1, CL2-2, and CL2-3 are spaced apart from one another.

In an exemplary embodiment illustrated in FIG. 13, the fourth conductive layer CL4 is disposed only in the first non-folding region NFA1 and the second non-folding region NFA2, and is not disposed in the folding region FA. Accordingly, the thickness in the third direction DR3 in the folding region FA of the sensing panel SP may be smaller than the thicknesses in the third direction DR3 in the first non-folding region NFA1 and second non-folding region NFA2.

When the fourth conductive layer CL4 is not disposed in the folding region FA, the wiring resistance between the second sensing electrodes SE2-1 to SE2-10 may increase. In an exemplary embodiment, the second auxiliary conductive layers CL2-1, CL2-2 and CL2-3 may be electrically connected to the fourth conductive layer CL4 through the contact holes CH1, CH2, and CH3 and the third conductive layer CL3. Accordingly, an increase in the wiring resistance due to the fourth conductive layer CL4 not being disposed in the folding region FA may be compensated by the auxiliary lines AUX_L1, AUX_L2 and AUX_L3.

As illustrated in FIG. 13, in an exemplary embodiment, in the folding region FA, the first auxiliary conductive layers CL1-1, CL1-2, and CL1-3 and the second auxiliary conductive layers CL2-1, CL2-2, and CL2-3 may be respectively disposed between electrode lines among the electrode lines EL4-1, EL4-2, EL5-1 and EL5-2, which are formed of the first conductive layer CL1 and the second conductive layer CL2 and extend in the second direction DR2.

Figure 14:
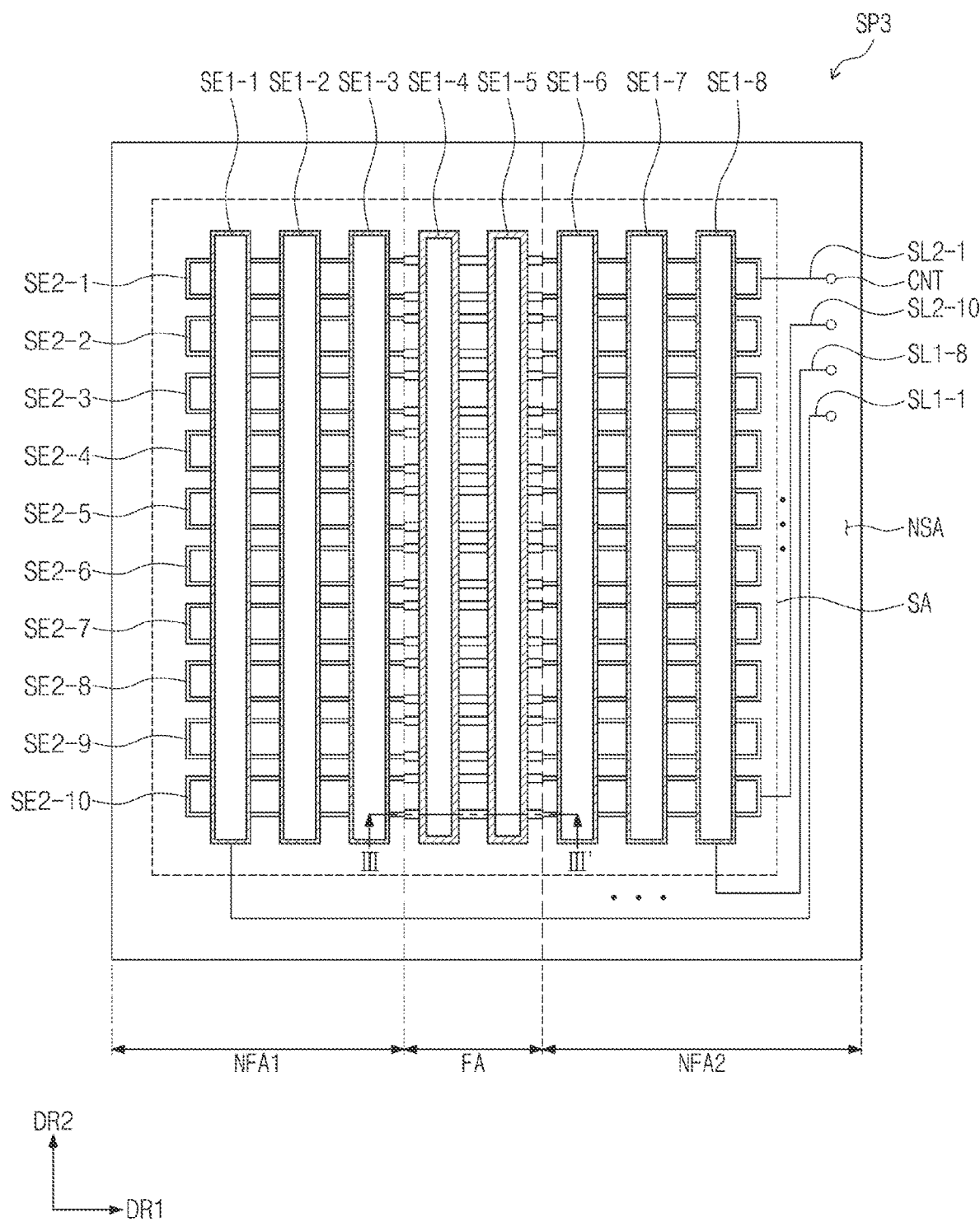
FIG. 14 is a plan view of a sensing panel according to an exemplary embodiment of the inventive concept.

FIG. 14 is a plan view of a sensing panel SP3 according to an exemplary embodiment of the inventive concept.

As illustrated in FIG. 14, a sensing panel SP3 may include first sensing electrodes SE1-1 to SE1-8, second sensing electrodes SE2-1 to SE2-10, first signal lines SL1-1 to SL1-8, and second signal lines SL2-1 to SL2-10. The sensing panel SP3 may include a sensing region SA and a wiring region NSA which respectively correspond to a display region DA and a non-display region NDA of a display panel DP. The sensing region SA may be defined as a region in which the first sensing electrodes SE1-1 to SE1-8 and the second sensing electrodes SE2-1 to SE2-10 are disposed. The wiring region NSA may be defined as a region in which the first signal lines SL1-1 to SL1-8 and the second signal lines SL2-1 to SL2-10 are disposed.

The sensing panel SP3 illustrated in FIG. 14 does not include the auxiliary lines AUX_L illustrated in FIG. 8. The line widths of the respective first sensing electrodes SE1-4 and SE1-5 which are disposed in the folding region FA of the sensing panel SP3 are larger than the line widths of the respective first sensing electrodes SE1-1 to SE1-3 which are disposed in the first non-folding region NFA1 and the line widths of the respective first sensing electrodes SE1-6 to SE1-8 which are disposed in the second non-folding region NFA2.

The second sensing electrodes SE2-1 to SE2-10 may be disposed in the first non-folding region NFA1, the folding region FA, and the second non-folding region NFA2. The second sensing electrodes SE2-1 to SE2-10 may each have a line width in the folding region FA which is larger than the line widths in the first non-folding region NFA1 and the second non-folding region NFA2.

Figure 15A:
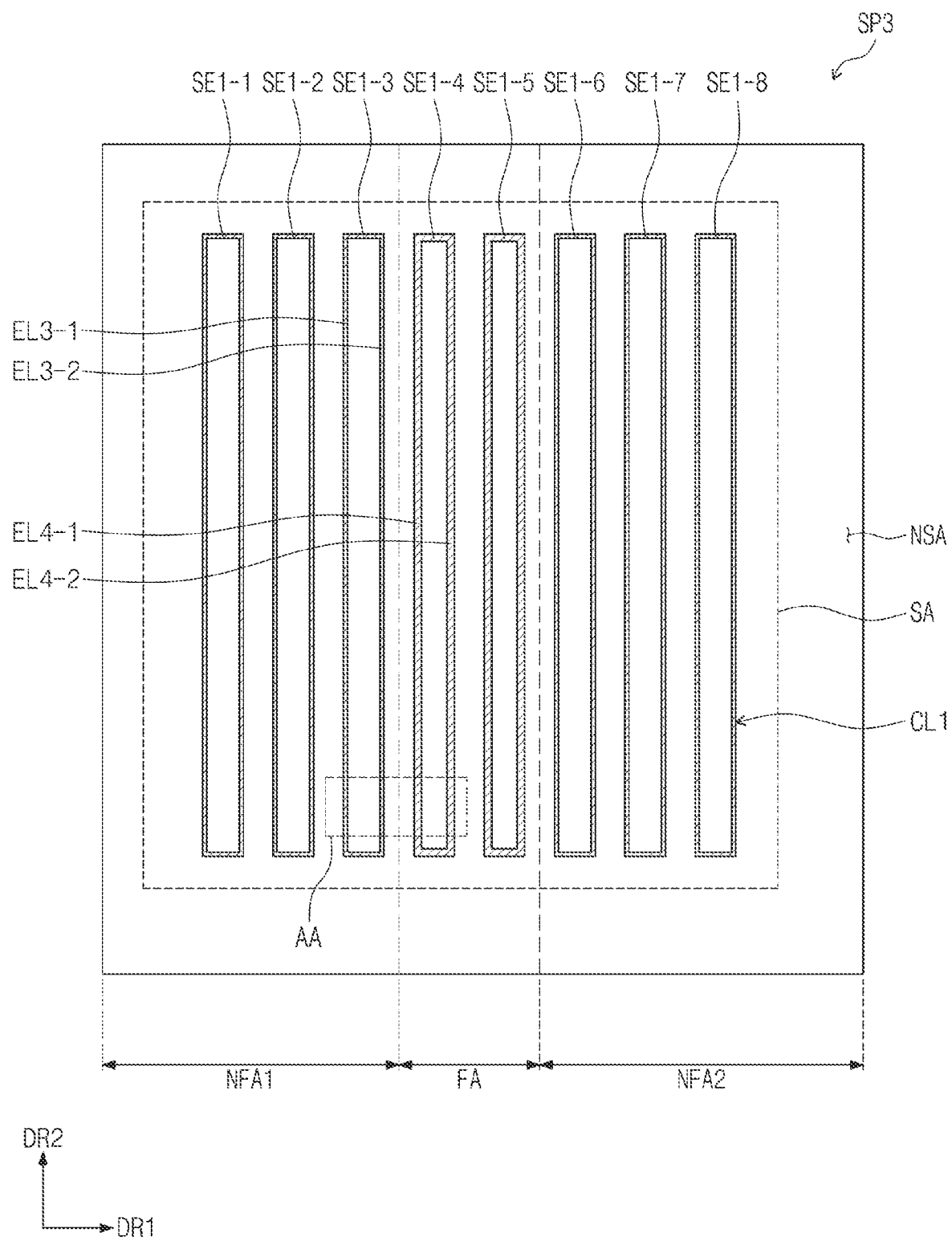
FIG. 15A is a plan view of a first conductive layer of a sensing panel according to an exemplary embodiment of the inventive concept.
Figure 15B:
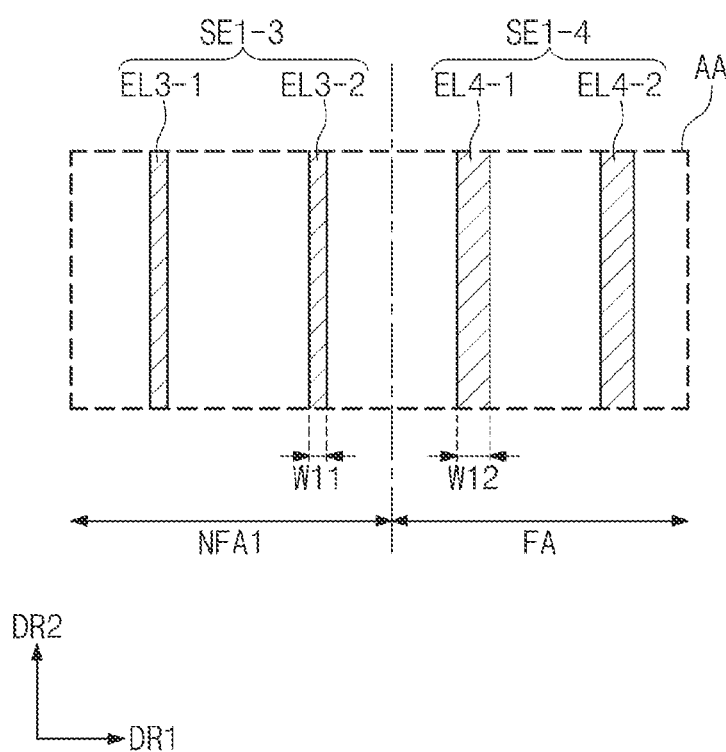
FIG. 15B is an enlarged view of a first region of FIG. 15A.

FIG. 15A is a plan view of a first conductive layer CL1 of the sensing panel SP3 according to an exemplary embodiment of the inventive concept. FIG. 15B is an enlarged view of the first region AA of FIG. 15A.

Referring to FIG. 15A, a first conductive layer CL1 may be formed by the first sensing electrodes SE1-1 to SE1-8. The line widths of the respective first sensing electrodes SE1-4 and SE1-5 which are disposed in the folding region FA of the sensing panel SP3 are larger than the line widths of the respective first sensing electrodes SE1-1 to SE1-3 which are disposed in the first non-folding region NFA1 and the line widths of the respective first sensing electrodes SE1-6 to SE1-8 which are disposed in the second non-folding region NFA2.

As illustrated in FIG. 15B, the line width W12 of electrode lines EL4-1 and EL4-2 of the first sensing electrode SE1-4 disposed in the folding region FA is larger than the line width W11 of electrode lines EL3-1 and EL3-2 of the first sensing electrode SE1-3 disposed in the first non-folding region NFA1.

Figure 16:
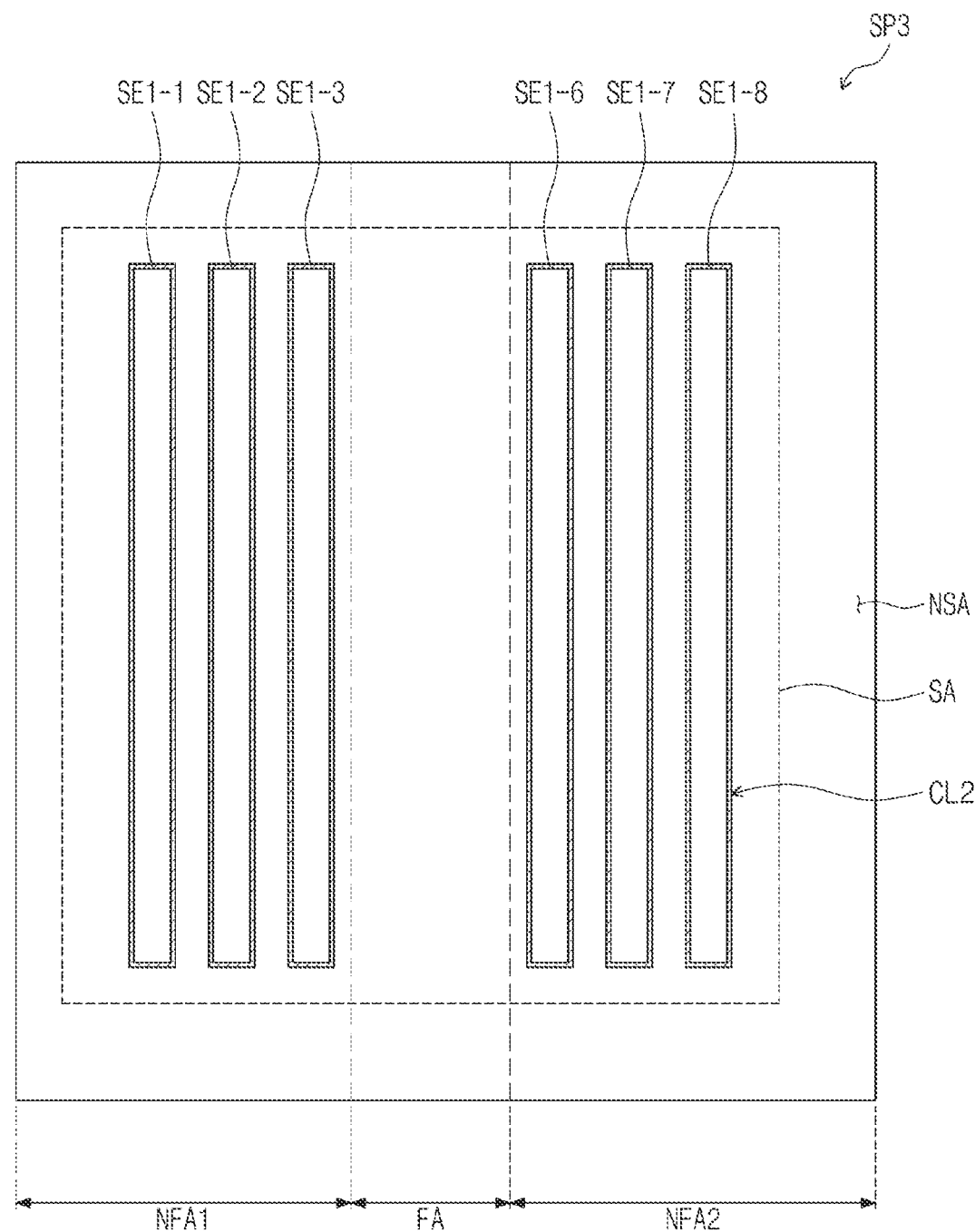
FIG. 16 is a plan view of a second conductive layer of a sensing panel according to an exemplary embodiment of the inventive concept.

FIG. 16 is a plan view of a second conductive layer CL2 of the sensing panel SP3 according to an exemplary embodiment of the inventive concept.

As illustrated in FIG. 16, the second conductive layer CL2 is disposed only in the first non-folding region NFA1 and the second non-folding region NFA2, and is not disposed in the folding region FA. First sensing electrodes SE1-1 to SE1-3 formed by the second conductive layer CL2 are disposed in the first non-folding region NFA1 and first sensing electrodes SE1-6 to SE1-8 are disposed in the second non-folding region NFA2.

Figure 17A:
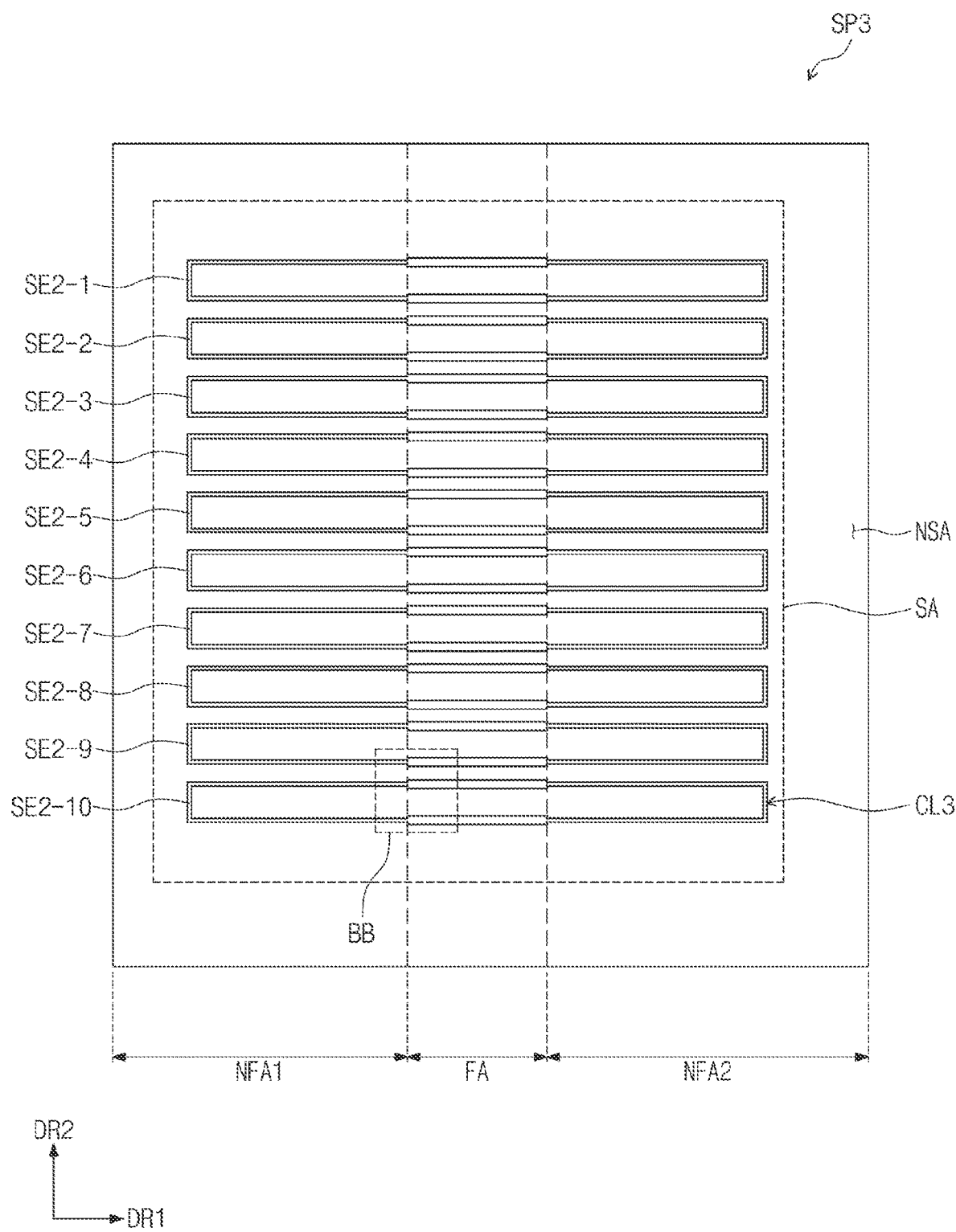
FIG. 17A is a plan view of a third conductive layer of a sensing panel according to an exemplary embodiment of the inventive concept.
Figure 17B:
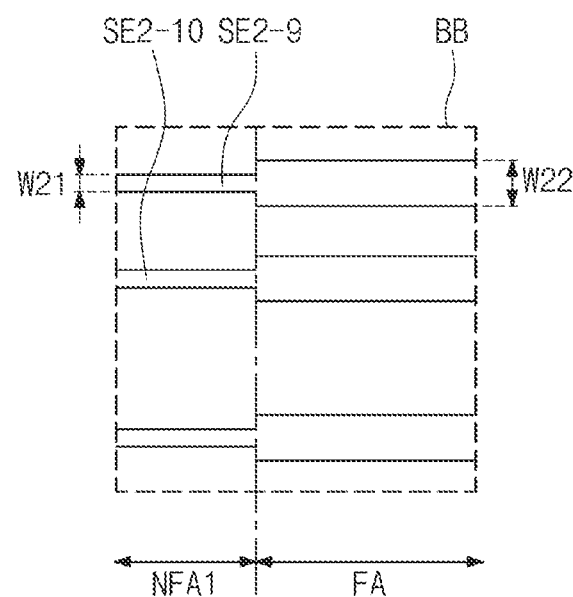
FIG. 17B is an enlarged view of a second region of FIG. 17A.

FIG. 17A is a plan view of a third conductive layer CL3 of the sensing panel SP3 according to an exemplary embodiment of the inventive concept. FIG. 17B is an enlarged view of the second region BB of FIG. 17A.

Referring to FIG. 17A, the third conductive layer CL3 is disposed in the first non-folding region NFA1, the folding region FA, and the second non-folding region NFA2. The line widths of respective second sensing electrodes SE2-1 to SE2-10 formed by the third conductive layer CL3 are larger in the folding region FA than in the first non-folding region NFA1 and the second non-folding region NFA2.

For example, as illustrated in FIG. 17B, the line width W22 in the folding region FA of the second sensing electrode SE2-9 is larger the line width W21 in the first non-folding region NFA1.

Figure 18:
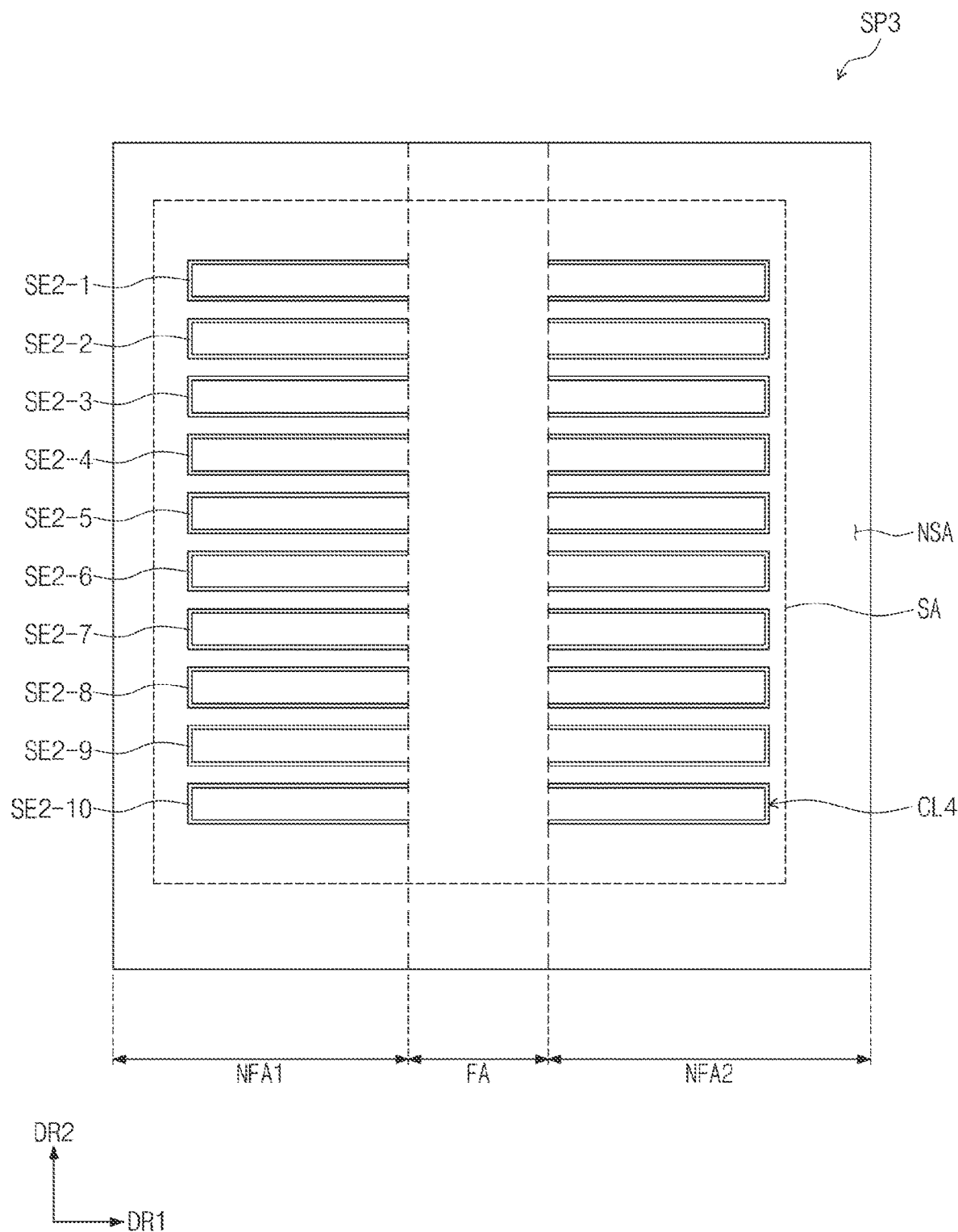
FIG. 18 is a plan view of a fourth conductive layer of a sensing panel according to an exemplary embodiment of the inventive concept.

FIG. 18 is a plan view of a fourth conductive layer CL4 of the sensing panel SP3 according to an exemplary embodiment of the inventive concept.

As illustrated in FIG. 18, the fourth conductive layer CL4 is disposed only in the first non-folding region NFA1 and the second non-folding region NFA2, and is not disposed in the folding region FA. The second sensing electrodes SE2-1 to SE2-10 formed by the fourth conductive layer CL4 are disposed only in the first non-folding region NFA1 and the second non-folding region NFA2, and are not disposed in the folding region FA.

Figure 19:
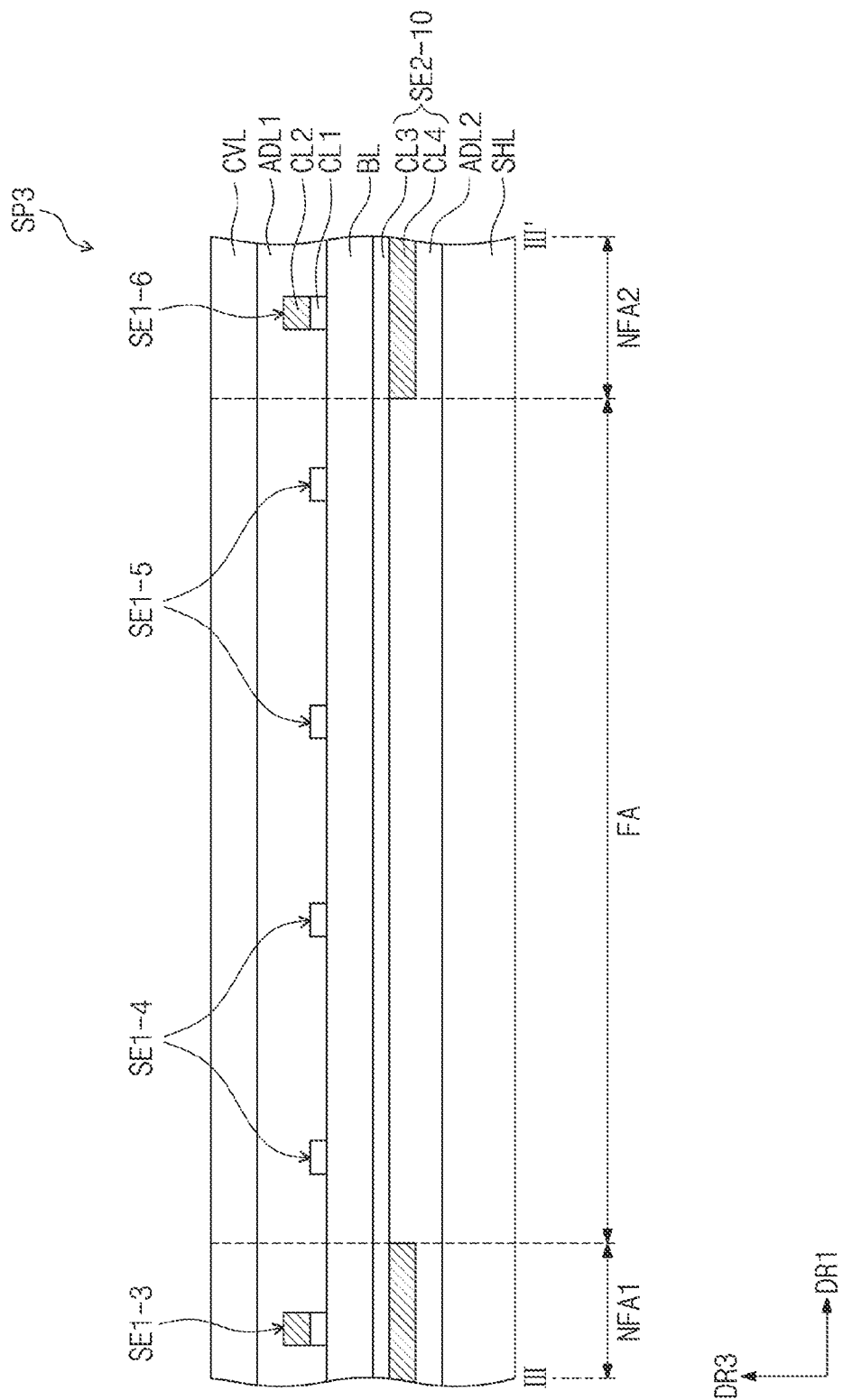
FIG. 19 is a cross-sectional view taken along line III-III' of FIG. 14 according to an exemplary embodiment of the inventive concept.

FIG. 19 is a cross-sectional view taken along line III-III' of FIG. 14 according to an exemplary embodiment of the inventive concept.

As illustrated in FIG. 19, the first sensing electrodes SE1-4 and SE1-5 disposed in the folding region FA are formed only by the first conductive layers CL1. The first sensing electrode SE1-3 disposed in the first non-folding region NFA1 is formed by the first conductive layer CL1 and the second conductive layer CL2. The first sensing electrode SE1-6 disposed in the second non-folding region NFA2 is formed by the first conductive layer CL1 and the second conductive layer CL2.

When the number of conductive layers that forms the first sensing electrodes SE1-4 and SE1-5 and the first sensing electrodes SE1-3 and SE1-6 are different, as is the case in an exemplary embodiment according to FIG. 19, the wiring resistance between the first sensing electrodes SE1-4 and SE1-5 and the first sensing electrodes SE1-3 and SE1-6 may be different. This may be compensated by increasing the line width of each of the first conductive layers CL1 which are disposed in the folding region FA and form the first sensing electrodes SE1-4 and SE1-5 compared to the line width of each of the first conductive layers CL1 disposed in the first non-folding region NFA1 and the second non-folding region NFA2, as illustrated in FIGS. 15A and 15B. The line width of each of the first sensing electrodes SE1-4 and SE1-5 may be determined on the basis of the level of increase of the wiring resistance when the second conductive layer CL2 is removed.

The second sensing electrode SE2-10 is formed by only the third conductive layer CL3 in the folding region FA, and is formed by the third conductive layer CL3 and the fourth conductive layer CL4 in the first non-folding region NFA1 and the second non-folding region NFA2.

When the second sensing electrode SE2-10 is formed by only the third conductive layer CL3 in the folding region FA, as is the case in an exemplary embodiment according to FIG. 19, the wiring resistance of the second sensing electrode SE2-10 increases. This may be compensated by increasing the line width of the third conductive layer CL3 which forms the second sensing electrodes SE2-1 to SE2-10 compared to the line width of the third conductive layer CL3 disposed in the first non-folding region NFA1 and the second non-folding region NFA2, as illustrated in FIGS. 17A and 17B. The line width of the third conductive layer CL3 in the folding region FA may be determined on the basis of the level of increase of the wiring resistance when the fourth conductive layer CL4 is removed.

The cover layer CVL may be coupled on to the second conductive layer CL2 via a thermosetting pressing method through the adhesive layer ADL1. In addition, the shield layer SHL may be attached to the fourth conductive layer CL4 via a thermosetting pressing method through the adhesive layer ADL2. After completing the thermosetting pressing process, the thickness of the folding region FA in the third direction DR3 is smaller than the thicknesses of the first non-folding region NFA1 and the second non-folding region NFA2 in the third direction DR3. As a result of the thickness of the folding region FA being reduced, the folding characteristic and durability of the sensing panel SP3 may be improved, and an increase in the wiring resistance of the first sensing electrodes SE1-1 to SE1-8 and the second sensing electrodes SE2-1 to SE2-10 may be prevented.

As shown in FIG. 19, in an exemplary embodiment, in the cross-sectional view taken along line III-III', the first conductive layer CL1 is disposed in the first non-folding region NFA1, the folding region FA, and the second non-folding region NFA2, the second conductive layer CL2 is disposed in the first non-folding region NFA1 and the second non-folding region NFA2 and is not disposed in the folding region FA, the third conductive layer CL3 is disposed in the first non-folding region NFA1, the folding region FA, and the second non-folding region NFA2, and the fourth conductive layer CL4 is disposed in the first non-folding region NFA1 and the second non-folding region NFA2 and is not disposed in the folding region FA.

Figure 20:
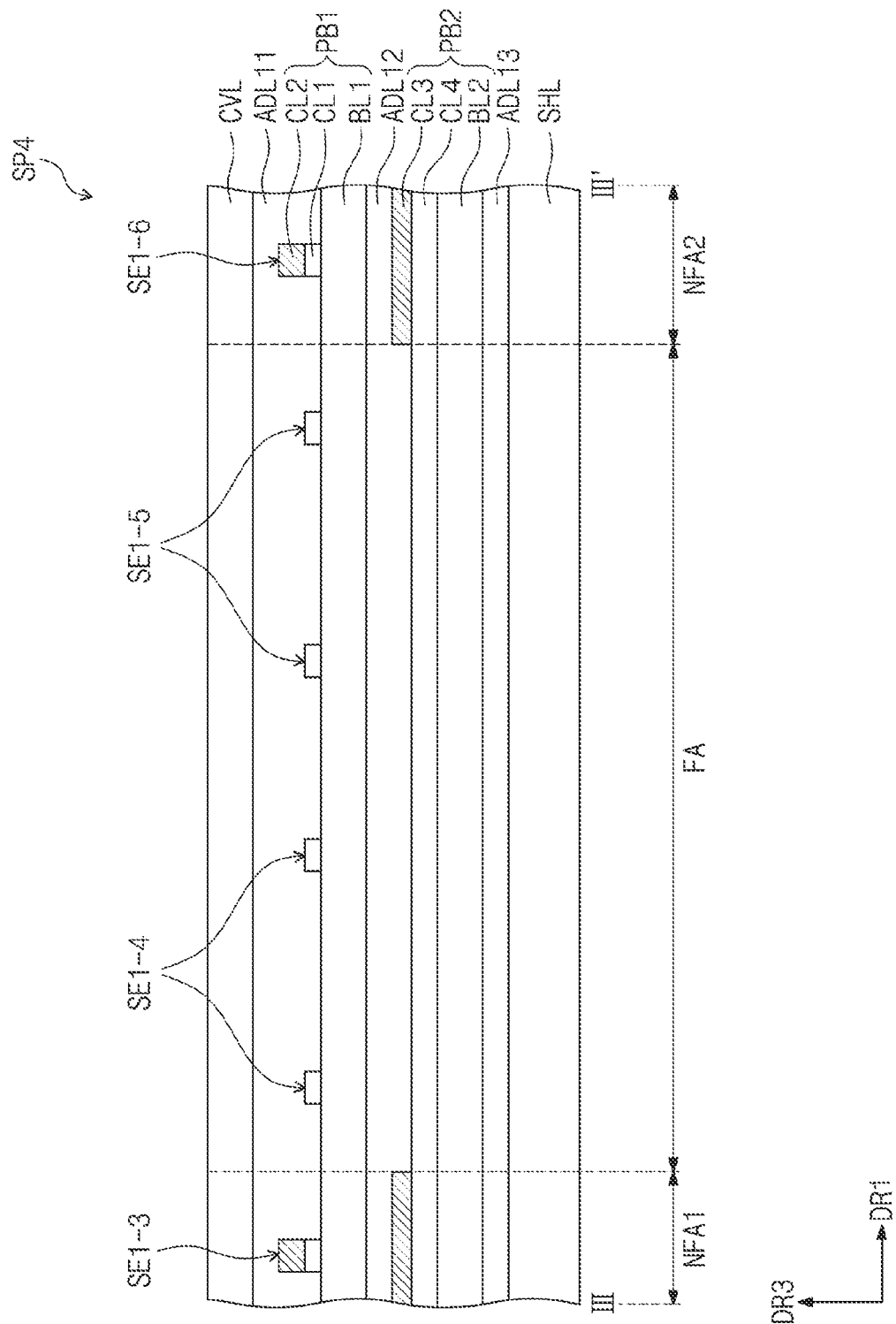
FIG. 20 is a cross-sectional view of a sensing panel according to an exemplary embodiment of the inventive concept.

FIG. 20 is a cross-sectional view of a sensing panel SP4 according to an exemplary embodiment of the inventive concept. FIG. 20 illustrates a cross-sectional view of the sensing panel SP4 at a position corresponding to line III-III' of the sensing panel SP3 illustrated in FIG. 14.

As illustrated in FIG. 20, the sensing panel SP4 includes a first panel board PB1, a second panel board PB2, adhesive layers ADL11, ADL12 and ADL13, a shield layer SHL, and a cover layer CVL. The first panel board PB1 includes a first base layer BL1, a first conductive layer CL1, and a second conductive layer CL2. The second panel board PB2 includes a second base layer BL2, a third conductive layer CL3, and a fourth conductive layer CL4. The first panel board PB1 and the second panel board PB2 may each be a flexible copper clad laminated film. The first panel board PB1 and the second panel board PB2 may be adhered to each other via the adhesive layer ADL12.

First sensing electrodes SE1-4 and SE1-5 disposed in a folding region FA are formed by only the first conductive layer CL1. First sensing electrode SE1-3 disposed in a first non-folding region NFA1 is formed by the first conductive layer CL1 and the second conductive layer CL2. First sensing electrode SE1-6 disposed in a second non-folding region NFA2 is formed by the first conductive layer CL1 and the second conductive layer CL2.

When the number of conductive layers that forms the first sensing electrodes SE1-4 and SE1-5 and the first sensing electrodes SE1-3 and SE1-6 are different, as is the case in an exemplary embodiment according to FIG. 20, the wiring resistance between the first sensing electrodes SE1-4 and SE1-5 and the first sensing electrodes SE1-3 and SE1-6 may be different. This may be compensated by increasing the line width of each of the first conductive layers CL1 which are disposed in the folding region FA and form the first sensing electrodes SE1-4 and SE1-5 compared to the line width of each of the first conductive layers CL1 disposed in the first non-folding region NFA1 and the second non-folding region NFA2, as illustrated in FIGS. 15A and 15B. The line width of each of the first sensing electrodes SE1-4 and SE1-5 may be determined on the basis of the level of increase of the wiring resistance when the second conductive layer CL2 is removed.

The second sensing electrode SE2-10 is formed by only the third conductive layer CL3 in the folding region FA, and is formed by the third conductive layer CL3 and the fourth conductive layer CL4 in the first non-folding region NFA1 and the second non-folding region NFA2.

When the second sensing electrode SE2-10 is formed by only the third conductive layer CL3 in the folding region FA, the wiring resistance of the second sensing electrode SE2-10 increases. This may be compensated by increasing the line width of the third conductive layer CL3 which forms the second sensing electrodes SE2-1 to SE2-10 compared to the line width of the third conductive layer CL3 disposed in the first non-folding region NFA1 and the second non-folding region NFA2, as illustrated in FIGS. 17A and 17B. The line width of the third conductive layer CL3 in the folding region FA may be determined on the basis of the level of increase of the wiring resistance when the fourth conductive layer CL4 is removed.

The cover layer CVL may be coupled to the second conductive layer CL2 via a thermosetting pressing method via the adhesive layer ADL11. In addition, the shield layer SHL may be attached to the lower surface of the second base layer BL2 via a thermosetting pressing method via the adhesive layer ADL13. After completing the thermosetting pressing process, the thickness of the folding region FA in the third direction DR3 is smaller than the thicknesses in the first non-folding region NFA1 and the second non-folding region NFA2 in the third direction DR3. Accordingly, the folding characteristic and durability of the sensing panel SP4 may be improved, and an increase in the wiring resistance of the first sensing electrodes SE1-1 to SE1-8 and the second sensing electrodes SE2-1 to SE2-10 may be prevented.

A display device having the above configuration may have improved durability and display quality as a display device.

While the present inventive concept has been particularly shown and described with reference to the exemplary embodiments thereof, it will be understood by those of ordinary skill in the art that various changes in form and detail may be made therein without departing from the spirit and scope of the present inventive concept as defined by the following claims.

What is claimed is:

1. A display device, comprising:
    a display panel comprising a folding region foldable with respect to a folding axis, a first non-folding region adjacent to a first side of the folding region, and a second non-folding region adjacent to a second side of the folding region in a plan view; and
    a sensing panel disposed on the display panel, wherein the sensing panel comprises:
    a base layer;
    a first conductive layer disposed on a first surface of the base layer;
    a second conductive layer disposed on the first conductive layer;
    a first auxiliary conductive layer disposed on the first surface of the base layer in the folding region and spaced apart from the first conductive layer, wherein the first auxiliary conductive layer and the first conductive layer are formed in a same layer;
    a second auxiliary conductive layer disposed on the first auxiliary conductive layer in the folding region and spaced apart from the second conductive layer;
    a third conductive layer disposed on a second surface of the base layer; and
    a fourth conductive layer disposed on the third conductive layer in the first non-folding region and the second non-folding region,
    wherein the second auxiliary conductive layer is electrically connected to the third conductive layer via a contact hole passing through the first auxiliary conductive layer and the base layer.

2. The display device of claim 1, further comprising:
    a cover layer disposed on the second conductive layer; and
    an adhesive layer disposed between the second conductive layer and the cover layer and coupling the second conductive layer and the cover layer.

3. The display device of claim 1, further comprising:
    a shield layer disposed on the fourth conductive layer; and
    an adhesive layer disposed between the fourth conductive layer and the shield layer and coupling the fourth conductive layer and the shield layer.

4. The display device of claim 1, wherein the sensing panel comprises a flexible copper clad laminated film.

5. The display device of claim 1, wherein
    the first non-folding region, the folding region, and the second non-folding region are sequentially disposed in a first direction, and
    the first conductive layer and the second conductive layer comprise electrode lines extending in a second direction crossing the first direction.

6. The display device of claim 5, wherein the first auxiliary conductive layer and the second auxiliary conductive layer are disposed between the electrode lines in the folding region.

7. The display device of claim 6, wherein the first auxiliary conductive layer and the second auxiliary conductive layer overlap the third conductive layer in the plan view.

8. The display device of claim 6, wherein the first surface and the second surface of the base layer are opposite to each other in a third direction crossing the first direction and the second direction.

9. A display device, comprising:
    a display panel comprising a folding region foldable with respect to a folding axis, a first non-folding region adjacent to a first side of the folding region, and a second non-folding region adjacent to a second side of the folding region in a plan view; and
    a sensing panel disposed on the display panel and comprising a first panel board and a second panel board,
    wherein the first panel board comprises:
    a first base layer;
    a first conductive layer disposed on a first surface of the first base layer;
    a second conductive layer disposed on the first conductive layer;
    a first auxiliary conductive layer disposed on the first surface of the first base layer in the folding region and spaced apart from the first conductive layer, wherein the first auxiliary conductive layer and the first conductive layer are formed in a same layer; and
    a second auxiliary conductive layer disposed on the first auxiliary conductive layer in the folding region and spaced apart from the second conductive layer,
    wherein the second panel board comprises:
    a second base layer;
    a third conductive layer disposed on a first surface of the second base layer; and
    a fourth conductive layer disposed on the third conductive layer in the first non-folding region and the second non-folding region,
    wherein the second auxiliary conductive layer is electrically connected to the third conductive layer via a contact hole passing through the first auxiliary conductive layer and the first base layer.

10. The display device of claim 9, further comprising:
    an adhesive layer disposed between the first panel board and the second panel board and coupling the first panel board and the second panel board.

11. The display device of claim 9, further comprising:
    a cover layer disposed on the second conductive layer; and
    an adhesive layer disposed between the second conductive layer and the cover layer and coupling the second conductive layer and the cover layer.

12. The display device of claim 9, wherein each of the first panel board and the second panel board comprises a flexible copper clad laminated film.

13. The display device of claim 9, further comprising:
    a shield layer disposed under the second base layer; and
    an adhesive layer disposed between the second base layer and the shield layer and coupling the second base layer and the shield layer.

14. The display device of claim 9, wherein
    the first non-folding region, the folding region, and the second non-folding region are sequentially disposed in a first direction, and
    the first conductive layer and the second conductive layer comprise electrode lines extending in a second direction crossing the first direction.

15. The display device of claim 14, wherein the first auxiliary conductive layer and the second auxiliary conductive layer are disposed between the electrode lines in the folding region.

16. The display device of claim 15, wherein the first auxiliary conductive layer and the second auxiliary conductive layer overlap the third conductive layer in the plan view.

17. A display device, comprising:
a display panel comprising a folding region foldable with respect to a folding axis, a first non-folding region adjacent to a first side of the folding region, and a second non-folding region adjacent to a second side of the folding region in a plan view; and
a sensing panel disposed on the display panel, wherein the sensing panel comprises:
a base layer;
a first conductive layer disposed on a first surface of the base layer;
a second conductive layer disposed on the first conductive layer in the first non-folding region and the second non-folding region;
a third conductive layer disposed on a second surface of the base layer; and
a fourth conductive layer disposed on the third conductive layer in the first non-folding region and the second non-folding region,
wherein
a line width of the first conductive layer disposed in the folding region is larger than the line width of the first conductive layer disposed in the first non-folding region and the second non-folding region,
the third conductive layer is disposed in the first non-folding region, the folding region, and the second non-folding region, and
a line width of the third conductive layer disposed in the folding region is larger than the line width of the third conductive layer disposed in each of the first non-folding region and the second non-folding region.

18. The display device of claim 17, wherein the first surface and the second surface are opposite to each other in a thickness direction of the sensing panel.

19. The display device of claim 17, further comprising:
a cover layer disposed on the second conductive layer; and
an adhesive layer disposed between the second conductive layer and the cover layer and coupling the second conductive layer and the cover layer.

20. The display device of claim 17, further comprising:
a shield layer disposed on the fourth conductive layer; and
an adhesive layer disposed between the fourth conductive layer and the shield layer and coupling the fourth conductive layer and the shield layer.

21. A display device, comprising:
a display panel comprising a folding region foldable with respect to a folding axis, a first non-folding region adjacent to a first side of the folding region, and a second non-folding region adjacent to a second side of the folding region; and
a sensing panel disposed on the display panel, wherein the sensing panel comprises:
a base layer;
an upper conductive layer disposed on an upper surface of the base layer;
an auxiliary conductive layer disposed on the upper surface of the base layer in the folding region and spaced apart from the upper conductive layer;
a first lower conductive layer disposed on a lower surface of the base layer; and
a second lower conductive layer disposed on a lower surface of the first lower conductive layer in the first non-folding region and the second non-folding region,
wherein the auxiliary conductive layer is electrically connected to the first lower conductive layer via a contact hole passing through the base layer.

22. The display device of claim 21, wherein the auxiliary conductive layer is not disposed in the first non-folding region and the second non-folding region.

23. The display device of claim 22, wherein the second lower conductive layer is disposed in the first non-folding region and the second non-folding region, and is not disposed in the folding region.

* * * * *